(12) United States Patent
Einsle

(10) Patent No.: US 12,111,238 B2
(45) Date of Patent: Oct. 8, 2024

(54) DEVICE AND METHOD FOR WETTING BIOLOGICAL MATERIAL

(71) Applicant: PRIME23 GMBH, Rapperswil (CH)

(72) Inventor: Xaver Einsle, Gebertingen (CH)

(73) Assignee: PRIME23 GMBH, Rapperswill (CH)

( * ) Notice: Subject to any disclaimer, the term of this patent is extended or adjusted under 35 U.S.C. 154(b) by 976 days.

(21) Appl. No.: 16/472,780

(22) PCT Filed: Dec. 20, 2017

(86) PCT No.: PCT/EP2017/083860
§ 371 (c)(1),
(2) Date: Jun. 21, 2019

(87) PCT Pub. No.: WO2018/115145
PCT Pub. Date: Jun. 28, 2018

(65) Prior Publication Data
US 2019/0368983 A1 Dec. 5, 2019

(30) Foreign Application Priority Data

Dec. 21, 2016 (DE) .......................... 102016225885.0

(51) Int. Cl.
*G01N 1/31* (2006.01)
*B01L 1/02* (2006.01)
*B01L 3/00* (2006.01)

(52) U.S. Cl.
CPC .............. *G01N 1/312* (2013.01); *B01L 1/025* (2013.01); *B01L 3/52* (2013.01);
(Continued)

(58) Field of Classification Search
CPC . G01N 1/312; B01L 1/025; B01L 3/52; B01L 2200/026; B01L 2200/0684;
(Continued)

(56) References Cited

U.S. PATENT DOCUMENTS 4,034,700 A 7/1977 Bassett et al.
5,338,358 A 8/1994 Mizusawa et al.
(Continued)

FOREIGN PATENT DOCUMENTS

CN 101966435 A 2/2011
DE 3031671 A1 3/1981
(Continued)

*Primary Examiner* — Matthew D Krcha
*Assistant Examiner* — Tingchen Shi
(74) *Attorney, Agent, or Firm* — FisherBroyles, LLP; Jason P. Mueller

(57) ABSTRACT

This disclosure relates to a device configured to wet a biological material with at least one liquid, and a disclosed method relates to wetting biological material with at least one liquid using the disclosed device. A disclosed device includes a moving arrangement and a platform configured to receive at least one, substantially triangular or substantially rectangular slide comprising a biological material. The slide is configured to be movable by the moving arrangement from a parallel incubating position, relative to said platform, into a non-parallel collecting position, relative to said platform. Only a single corner section of slide is positioned such that said liquid is collected in the single corner section. Introducing reagents into a mixing zone of said device and repeatedly moving the slide from the collecting position into a mixing position causes mixing of the reagents to thereby generate the liquid that is configured to wet the biological material.

9 Claims, 21 Drawing Sheets

Figure 1:
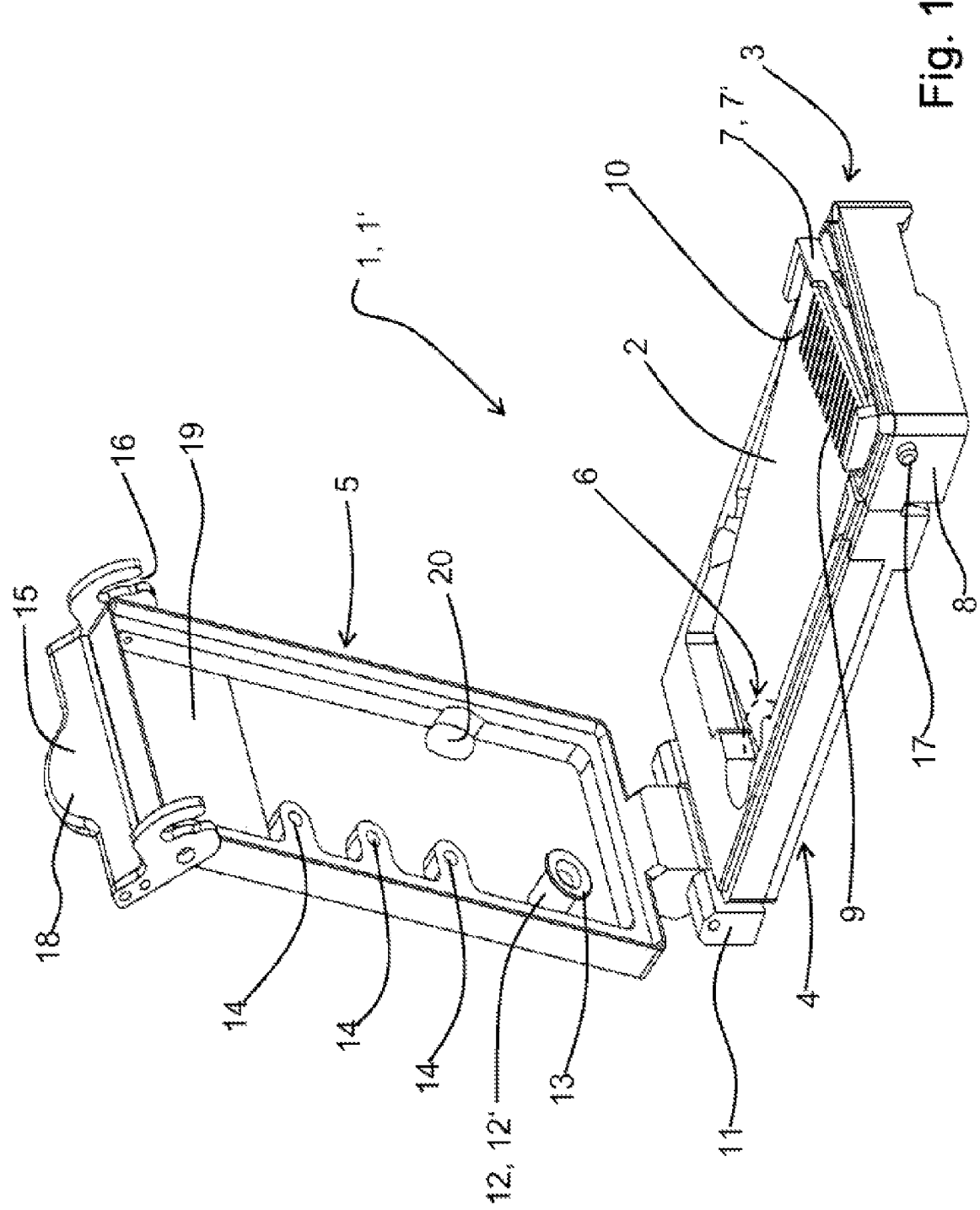

(52) U.S. Cl.
CPC . *B01L 2200/026* (2013.01); *B01L 2200/0684* (2013.01); *B01L 2300/021* (2013.01); *B01L 2300/042* (2013.01); *B01L 2300/046* (2013.01); *B01L 2300/0609* (2013.01); *B01L 2300/0851* (2013.01); *B01L 2300/12* (2013.01); *B01L 2300/16* (2013.01); *B01L 2400/0406* (2013.01)

(58) Field of Classification Search
CPC ......... B01L 2300/021; B01L 2300/046; B01L 2300/0609; B01L 2300/0851; B01L 2300/12; B01L 2300/16
See application file for complete search history.

(56) References Cited

U.S. PATENT DOCUMENTS

| | | | |
|---|---|---|---|
| 8,337,786 B2 | 12/2012 | McLellan et al. | |
| 8,877,485 B2 | 11/2014 | Larsen et al. | |
| 2005/0153453 A1* | 7/2005 | Copeland | G01N 35/025 436/180 |
| 2006/0013063 A1 | 1/2006 | Singh | |
| 2008/0102006 A1* | 5/2008 | Kram | G01N 35/1065 222/1 |
| 2010/0113288 A1* | 5/2010 | Adey | G01N 35/00029 422/106 |
| 2010/0203624 A1 | 8/2010 | Singh | |
| 2011/0136135 A1* | 6/2011 | Larsen | G01N 35/00029 435/7.1 |
| 2013/0052331 A1* | 2/2013 | Kram | G01N 1/2813 118/100 |
| 2013/0171616 A1 | 7/2013 | Niazi | |
| 2013/0309688 A1 | 11/2013 | Barker et al. | |
| 2015/0111202 A1 | 4/2015 | Bui et al. | |
| 2015/0138913 A1 | 5/2015 | Jones et al. | |

FOREIGN PATENT DOCUMENTS

| | | |
|---|---|---|
| DE | 10218988 C1 | 11/2003 |
| DE | 102004054125 A1 | 5/2006 |
| DE | 202017101988 U1 | 8/2017 |
| EP | 2573571 A2 | 3/2013 |
| GB | 1088421 A | 10/1967 |
| WO | 91/13335 A1 | 9/1991 |
| WO | 01/74992 A2 | 10/2001 |

\* cited by examiner

DEVICE AND METHOD FOR WETTING BIOLOGICAL MATERIAL

CROSS-REFERENCE TO RELATED APPLICATIONS

This application is a national stage entry under 35 U.S.C. 371 of PCT Patent Application No. PCT/EP2017/083860, filed Dec. 20, 2017, which claims priority to German Patent Application No. 102016225885.0, filed Dec. 21, 2016, the entire contents of each of which are incorporated herein by reference.

This disclosure relates to a device for wetting biological material with at least one liquid. Furthermore, the disclosure relates to a method for wetting biological material with at least one liquid making use of a corresponding device.

Devices for the wetting of biological material have been known in practice for many years and they exist in the most varied of configurations. Merely as an example one may refer to the device of DE 102 18 988 C1, which includes a device for supporting a slide. This is designed such that the slide is spaced apart from a platform. Furthermore, the incubation chamber is configured such that the slide can be raised or lowered relative to the platform inside the incubation chamber by use of a further device. The side of the slide on which the material to be investigated is placed is facing toward the platform and the space between slide and platform can be filled with a liquid reagent, within the chamber.

Furthermore, a device for wetting of biological material is described in U.S. Pat. No. 5,338,358 B2. This device likewise has a device for supporting a slide. However, this is designed such that the slide is spaced apart from a platform in a non-parallel position. In order to ensure that the biological material is fully and sufficiently wetted with a liquid reagent, the wedge-shaped space between slide and platform must be filled with a relatively large volume of the reagent.

U.S. Pat. No. 8,877,485 B2 discloses a method and an automatic machine for the preparing of biological samples. In the machine, at least one staining device is provided, containing an arrangement of slides and a corresponding arrangement of covers. These two arrangements are placed in a position relative to each other such that capillary gaps are formed between the respectively slanted slides and the corresponding covers. The capillary gaps thus created can then be filled with a staining solution for staining the sample, which remains in the slanted capillary gaps opposing the force of gravity. For all other preparation stages, the slides are transported to other devices of the machine. For example, slides may be transferred to a deparaffinization device or a washing device.

The published U.S. patent application US 2015/0111202 A1 describes a further automatic staining machine for biological material placed on a slide. In particular, it describes a cover-less reaction chamber which can be used in the machine, in which a slide carrying the biological material can be inserted. In the chamber, the slide is situated at a distance from a platform, so that a non-parallel gap is formed between the side of the slide, on which the biological material has been placed, and the platform. The gap can be filled with a reaction solution. While the gap is being filled with solution, the slide rests against spacers provided for this purpose, without being moved, so that the solution located in the gap only flows once more when the gap is being emptied.

The likewise known device of U.S. Pat. No. 8,337,786 B2 represents an incubation chamber which is created by putting a cover onto a slide, thereby forming a space closed off by the cover above the material present on the slide. This space is then filled in turn with reaction solution. The supplying of the reaction solution to the incubation chamber in the known device occurs by use of a liquid reservoir situated outside the chamber, from which the chamber space can be passively filled by virtue of the capillary forces created. However, the cover must be pressed onto the slide by use of a clamping effect in order to ensure the tightness of the incubation chamber during the reaction process.

In order to empty the chamber, the clamping is released and the liquid is aspirated from the end opposite the liquid reservoir. Due to the pressing of the cover against the slide and the subsequent releasing, however, capillary forces arise, which draw a certain amount of the reaction solution beneath the support surfaces of the cover. Thus, a residual amount of the reaction solution remains, which—in the event of a directly sequential filling of the chamber with different solutions—will result in contamination of the next solution introduced. Furthermore, solution residues remain upon removal of the chamber on the slide, resulting in a heightened risk of contamination for the user.

The underlying object of the present disclosure is to design and modify a device and a method for wetting of biological material such that the introducing and removing of the liquids needed for the wetting is optimized with simple design considerations.

According to the disclosure, the above object is solved by the features of patent claim 1. Accordingly, the device according to the disclosure includes a moving arrangement and a platform for receiving at least one substantially triangular or substantially rectangular, slide comprising the biological material, wherein the slide is movable by the moving arrangement from a parallel reaction position relative to said platform into a non-parallel collecting position relative to the platform, wherein only one corner region of the slide is not or is only slightly elevated in the collecting position, such that the liquid collects in this corner region.

The term "reaction position" should be taken in the broadest meaning and describes in particular a position of the slide relative to the platform in which a capillary gap can be formed between the platform and the slide. This capillary gap can be filled with the reaction solution, so that the biological material located on the side of the slide facing toward the capillary gap can be wetted with the reaction solution. The side of the slide facing toward the capillary gap can be called the "bottom side" of the slide, regardless of the spatial orientation of the slide.

The term "collecting position" should likewise be understood in the broadest sense and describes in particular a position of the slide in which only one corner region of the slide is not raised or is only slightly raised. In this lower situated corner region as compared to the other corner regions of the slide, the liquid for wetting the biological material can thus be collected and advantageously removed.

The term "slide" should likewise be understood in the broadest sense and describes an element which can be configured so as to have a surface on which the biological material to be wetted can be placed and which can form a parallel capillary gap with the corresponding surface. The term thus encompasses both conventional rectangular slides known in the field of microscopy and slides existing in other geometrical shapes.

In an inventive manner it has been discovered, first of all, that the stated object can be solved in surprisingly simple manner by a suitable moving arrangement of the device. In particular, it has been discovered that the movement of the slide which can be created by the device according to the disclosure is especially well suited to wetting biological material on a slide with the liquid reagents needed for immunohistochemical tissue studies and stainings.

Furthermore, the device according to the disclosure is also especially suitable for mixing the reagents efficiently and thoroughly, so that the chemical and biochemical reactions can occur faster in such tissue studies and stainings.

In particular, both the so-called pretreatment stages of "dewaxing or deparaffinization" and "antigen retrieval" during an immunohistochemical staining and "dewaxing or deparaffinization" during an in situ hybridization study and the actual tissue staining during detection methods, such as immunohistochemical staining, and during in situ hybridization studies can be speeded up. Furthermore, biochemical bonding reactions can occur faster in the device according to the disclosure. For example, the wetting of biological material on slides, especially protein and/or RNS-containing material on so-called BioChips, can be realized especially efficiently in the incubation chamber according to the disclosure.

Especially in enzyme-related investigation methods, highly reactive and short-lived substrate solutions are often used for the wetting of biological material, which need to be prepared from two or more components immediately prior to their use. However, such substrate solutions are not only very expensive, but also quite often they are unstable, so that they may decompose and become worthless in a short time. Advantageously, such solutions can be prepared directly in a mixing zone of the incubation chamber of the device according to the disclosure, if it is configured as an incubation chamber. Consequently, such solutions can therefore be prepared immediately prior to their use.

Furthermore, thanks to repeated movement of the slide from the reaction position to the collecting position and back to the reaction position, not only is the liquid advantageously blended and spread out, but also bubbles are removed from the capillary gap between the slide and the bottom plate of the platform. This, in turn, contributes advantageously to a more homogeneous and efficient course of the chemical and biochemical reactions in the capillary gap.

When performing immunohistochemical staining and/or in situ hybridization studies of biological material placed on a slide, hydrophobic regions are often created, for example, by wax or paraffin remaining in the material being wetted. In further inventive manner, a flow movement of the liquid can be brought about by the movement of the slide, making possible an especially uniform wetting of biological material, even when the biological material has hydrophobic regions.

Advantageously, the moving arrangement can include a moving device, which in turn includes a support for the slide and, an anchoring member. Advantageously, the moving arrangement may be a rocker. In especially advantageous manner, the moving device or the rocker can be placed in a lifted position as well as a tilted position by at least one lifting device. In the lifted position at least two corner regions of the slide are not or are only slightly elevated, wherein the slide in the tilted position is then in the collecting position.

The slide can rest by one region against the support of the moving device that is provided for the labeling or identification of the slide and the biological material located on it, i.e., a region which may also be called the labeling section of the slide. Advantageously, slides which are to be used in the device according to the disclosure may include a labeling section in the labeling portion of the slide. The labeling section may be provided or labeled with a barcode, making possible the identification of the slide and the biological material placed on it. The labeling section may be located on the side of the labeling portion of the slide facing away from the capillary gap. The side of the slide comprising the labeling section and facing away from the capillary gap may be termed the "top side" of the slide, regardless of the physical orientation of the slide.

In further advantageous manner, the moving device includes a receiving region for the at least one lifting device. For example, the lifting device can be designed as a plunger, which protrudes into the receiving region. Alternatively or additionally, it is conceivable for the receiving region to include an anchoring element for the lifting device, so that the anchoring element defines an axis of the moving device about which the moving device can rotate into the tilted position. For example, the receiving region may be a cavity corresponding in shape to the plunger, wherein the anchoring element, in the form of a pin, protrudes into the cavity. The plunger corresponding in shape to the cavity may in turn contain an opening corresponding in shape to the pin, so that plunger and pin can be brought into a rotatable connection relative to each other. Alternatively, the lifting device may also make direct contact with the slide.

Furthermore, the moving device and/or the anchoring member of the moving device is designed such that it can be brought into contact with a corresponding anchoring surface. Thanks to such a contact of the moving device and/or the anchoring member with said anchoring surface, the moving device rotates from the elevated position into the tilted position. The anchoring member may be configured as a protruding portion, as an abutting lip, of the moving device. The corresponding anchoring surface may be configured as a protrusion of the material of the device, in particular as an end stop. The end stop, in turn, can be configured as a protruding edge of a side wall of the moving arrangement, of an inner side wall of the moving arrangement.

In advantageous embodiments, the device according to the disclosure contains a moving arrangement which on the one hand may include a projecting edge at one inner side wall and on the other hand a liftable and rotatable moving device with an abutting lip. When the abutting lip of the moving device comes into contact with the corresponding end stop of the moving arrangement, the movement of the lifting device can result in a movement of the moving device, which moves the slide from the reaction position parallel to the platform into the collecting position non-parallel to the platform.

Instead of having the shape of a projecting edge, the corresponding anchoring surface may be curved. For example, the anchoring surface may be configured as the side surface of a substantially cylindrically shaped end stop. In such a configuration, when the moving device comes into contact with the curved anchoring surface, the moving device rotates substantially along the curve dictated by the curvature. In alternative, advantageous embodiments, the device according to the disclosure contains on the one hand an end stop provided by a curved surface and on the other hand a liftable and rotatable moving device, which can make contact with the substantially cylindrically shaped end stop. Thanks to the movement of the lifting device, the moving device can furthermore rotate along the curved side surface of the end stop, so that the slide is moved from the reaction position to the collecting position.

The receiving region for the at least one lifting device can be a cavity of the moving device configured as guide rails.

For example, in such embodiments the lifting device is a plunger which protrudes into the guide rails. In this way, a movement of the plunger inside the guide rails results in a movement of the moving device dictated by the shape of the guide rails. This movement may be a multidirectional movement. This movement dictated by the guide rails may in turn bring about the movement of the slide from the reaction position to the collecting position.

The movement of the slide from the reaction position to the collecting position corresponds to a three-dimensional movement (3-D movement) of the slide. The 3-D movement includes a lifting and lowering of the slide along the Y-axis, a sideways displacement of the slide along the X-axis, and a tilting or rotating of the slide around or about the Z-axis. The sequence of the respective movements along one of the three aforementioned geometrical axes need not be definite and it can be combined however is desired.

The movement of the slide by use of the device according to the disclosure may be done continuously or discontinuously. For example, an upward movement of the lifting device can bring about the movement of the slide from the reaction position to the collecting position, while the contrary downward movement of the lifting device brings the slide back from the collecting position to the reaction position. Thus, thanks to controlling the movement of the lifting device, the movement of the slide can also be controlled and it can optionally be halted in any desired position between the reaction position and the collecting position. The controlled 3-D movement of the slide allows a precise guidance of the liquid with which the biological material present on the slide can be wetted in the device.

In advantageous manner, a capillary gap can be formed in the reaction position between the slide and the platform. Thanks to the movement of the slide by the moving arrangement and with the assistance of the acting forces of adhesion, a targeted guidance of a liquid present in the capillary gap is made possible. In particular, the liquid can be guided to collect entirely in the corner region of the slide which is not raised or only slightly raised. Furthermore, by a repeated movement of the slide from the reaction position to the collecting position, a mixing of the liquid in the capillary gap, a removal of bubbles from the capillary gap and/or a speeding up of biochemical reactions in the capillary gap can be advantageously realized.

In particular, the capillary gap can be formed between the platform, which may be a bottom plate of the device, and the surface of the slide on which the biological material is placed, i.e., the active surface of the slide. The active surface of a slide may encompass the entire surface of one side of the slide, minus the surface of the labeling section.

The volume of the capillary gap can be determined by the distance of the slide from the platform or bottom plate. In particular, the device has special spacers which keep the slide away from the platform or bottom plate in the parallel reaction position. The spacers may be configured as projections or elevations of the platform. In other embodiments, the spacers may be configured as projections of one or more side walls of the device. In particular, the spacers form support points or surfaces on which the slide rests in the parallel reaction position. The spacers may be configured such that the gap between the slide and the platform or bottom plate in the parallel reaction position has a height which is at least larger than the thickness of the biological material placed on the slide. Advantageously, the spacers may be configured such that the gap between the slide and the platform or bottom plate in the parallel reaction position has a height of 0.005 mm [to\ 0.5 mm, especially one of 0.01 mm to 0.3 mm, in particular one of 0.05 mm to 0.2 mm. Furthermore, any other designs are conceivable here that space the slide away from the platform so that a parallel capillary gap can be formed extending over the entire active surface of the slide.

As regards the at least one liquid with which the slide is to be wetted, many possibilities exist. In especially advantageous manner, the at least one liquid is a reaction liquid, which is selected from the group consisting of: buffer solutions; growth solutions; dehydration solutions; blocking solutions; ligand solutions; antibody solutions; washing solutions; staining solutions; cleaning solutions; dewaxing solutions; deparaffinizing solutions; alcohol solutions; rehydration solutions; activating or inactivating solutions; antigen-retrieval solutions; hybridization solutions; and substrate solution.

Furthermore, the controlled 3-D movement of the slide may be utilized to mix several reagents in a liquid. For this purpose, the movement of the slide from the reaction position to the collecting position and back again can be done repeatedly.

In advantageous manner, the device may include an outlet. The outlet may be an opening for the liquid, wherein the outlet may be configured such that it is in fluidic communication with the only one corner region of the slide which is not or is only slightly elevated in the collecting position. In this way, the liquid can be removed, in particular aspirated, from the device through the outlet. In advantageous manner, the liquid can be entirely removed through the outlet. In especially advantageous manner, the liquid can be entirely aspirated through the outlet.

For the movement of the slide from the reaction position to the collecting position it is of further advantage for the device to include an abutment. The abutment can be brought into contact with the slide on the surface facing away from the support. Thus, the contact with the abutment supports the movement of the slide from the incubating position to the collecting position.

The device according to the disclosure may be incubation chamber for immunohistochemical analyses, in situ hybridization analyses, tissue stainings, bio-chip stainings, or the like, of the biological material. The biological material may be tissue or cell sections. Such tissue sections may be, for example, sections of tumor tissue.

In one realization of the device according to the disclosure as an incubation chamber, this may include a base body with a bottom plate and a moving arrangement with a rocker housing and a rocker according to the disclosure for the three-dimensional movement of the slide situated in the chamber.

The incubation chamber may advantageously include a lid, so that in the closed state a saturated atmosphere can be generated inside the chamber. The lid may include a reading window, which is arranged such that in the closed state of the chamber it is associated with the labeling section of the slide such that a barcode is readable through the reading window. In particular, the material of the barcode reading window is designed so that it does not deflect or only slightly deflects laser or infrared rays for the reading of the barcode on the labeling section, so that the barcode can be read through the barcode reading window. The base body and the rocker housing of the incubation chamber are designed as separate components, which can be locked relative to each other by the lid when the chamber is closed. In particular, the rocker housing can be designed so as to be attachable to a base plate, so that the base body of the chamber can be locked by the closing of the lid not only relative to the rocker housing but also relative to the base plate. The base plate may be the base plate of an instrument, especially a staining instrument, on which the base body can be latched so that the platform or bottom plate of the incubation chamber can be brought into connection with a temperature element of the staining instrument. The temperature element can be a cooling element and/or a heat source. In particular, the temperature element may be designed such that it can both heat and cool the platform or bottom plate. The heat source may be a heating plate or a heating block. The saturated atmosphere in the closed incubation chamber can be created in particularly by the action of heat, by the action of heat through the platform. In particular, the saturated atmosphere can be created by slight evaporation of the reaction solutions and/or by the evaporation of a nonreactive liquid. The nonreactive liquid may be water, for example, which can be placed in addition into the incubation chamber. Thus, by heating the platform or bottom plate, an almost 100% saturated vapor atmosphere can be created.

Thanks to creating the vapor atmosphere in the closed incubation chamber, a further evaporation of the required reaction solutions in the capillary gap can be largely prevented. Nevertheless, the incubation chamber may include one or more liquid reservoirs, which can be filled with reaction solution by a slight overfilling of the capillary gap and which remain in fluidic communication with the reaction solution in the capillary gap. From these reservoirs, a possible slight evaporation loss of the reaction solution in the capillary gap can be compensated. The total amount of valuable and expensive reaction solutions can be reduced thanks to the vapor atmosphere created in the incubation chamber of the disclosure, since on the whole fewer volatilization or evaporation losses may occur. This is especially so during reaction stages which require high temperatures. For example, temperatures over 100° C. are usually required during the pretreatment of tissue sections for later immunohistochemical staining during the dewaxing/deparaffinization or during the antigen retrieval. Furthermore, the vapor atmosphere created advantageously makes it possible to carry out the above described repeated movement of the slide from the reaction position to the collecting position even in a high-temperature phase of the investigatory method, without the water moiety of the valuable reaction solutions required for the biochemical reactions rapidly evaporating in detrimental manner.

The device according to the disclosure may be designed as an incubation chamber, comprising:
(a) a base body with a platform to receive an at least approximately triangular, approximately rectangular slide holding the biological material;
(b) a moving arrangement which can be brought into a form-fitting and friction-locking connection with the base body, by which the slide can be moved from a reaction position parallel to the platform of the base body into a collecting position not parallel to the platform of the base body, wherein only one corner region of the slide in the collecting position is not raised or is only slightly raised, so that the liquid collects in this corner region, and
(c) a lid which can be closed with the base body as well as the moving arrangement in form-fitting and friction-locking manner,
wherein the closing of the lid produces the form-fitting and friction-locking connection between the base body and the moving arrangement.

In the device according to the disclosure, the base body may be single-piece or multi-piece. For example, a single-piece base body may include, besides the platform, also a liquid reservoir, which may be designed as a catchment or overflow basin for excessively introduced liquids. Furthermore, the single-piece base body may include a coupling element, which can make it possible to place the base body in a form-fitting and friction-locking connection with a holding block of the lid.

The device according to the disclosure may include a multi-piece base body, which can be composed of several form-fitting and friction-locking connected devices. For example, a multi-piece base body may be composed of a first device designed as a catchment or overflow basin, a second device designed as a platform, and a third device designed as a coupling element.

As already mentioned, the platform can be configured as a bottom plate of the device, while the bottom plate may consist of an inert material or can be coated with an inert material at least on the side facing toward the slide. The inert material ensures that the reaction solutions react solely with the biological material placed on the slide. In particular, the bottom plate can be formed as an inert sheet of polyimide, especially Kapton, or polyetherketone (PEEK), or it may be an inert coated aluminum plate.

The bottom plate may be configured such that it allows the most efficient possible heat transfer between a temperature element located beneath the bottom plate and the liquid in the capillary gap between the bottom plate and the active surface of the slide. In particular, the bottom plate may be configured such that temperature changes of the temperature element can be passed on with minimal delay to the liquid in the capillary gap. Advantageously, this delay (temperature delay) can be between 1 and 5° C./second during both heating and cooling. In order to assure the speeding up of the aforementioned chemical or biochemical reactions according to the disclosure, the temperature delay should not exceed a value of 5° C./second.

On the one hand, the thermal diffusivity of the platform or bottom plate can be influenced by the material thickness of the bottom plate, and on the other hand by the nature of the material itself. In many embodiments of the device according to the disclosure, the material thickness in the region of the bottom plate may be between 0.01 mm and 2 mm. Advantageously, the material thickness in the region of the bottom plate can be between 0.03 mm and 0.8 mm. Especially advantageously, the material thickness in the region of the bottom plate can be between 0.3 mm and 0.6 mm, especially 0.55 mm. In embodiments in which the bottom plate may be formed as an inert sheet of polyimide, especially Kapton, polyetherketone (PEEK) or another inert material, a material thickness of the sheet of 0.1 mm should not be exceeded.

Furthermore, the platform or bottom plate should have good flatness, on the one hand in order to produce a parallel capillary gap between the slide and the platform or bottom plate, and on the other hand to produce the most form-fitting connection to the temperature element, so as to advantageously influence the heat transfer between the platform or bottom plate and the liquid present in the capillary gap.

Flatness is a requirement for a surface "per se". The flatness deviation is the greatest distance between an adjacent plane and the real surface. The tolerance zone is bounded by two parallel planes at a spacing of $t_E$. All points of the real surface or derived center plane lie between the two parallel planes with the tolerance measure of the spacing $t_E$.

For example, the real surface of the platform or bottom plate may have manufacturing-related unevenness. In advantageous manner, the platform or bottom plate may be configured so that it has no unevenness whose height might hinder the formation of the parallel capillary gap. In particular, the platform or bottom plate may be configured such that it has elevations of less than 0.1 mm, especially less than 0.05 mm, especially less than 0.03 mm.

Materials from which the platform or bottom plate can be fabricated according to the disclosure include inert temperature conducting materials and/or materials which may be provided with an inert coating. For example, the platform or bottom plate can be made of aluminum, refined steel, a copper alloy, or an iron plate. In particular, the platform or bottom plate consist of aluminum, especially anodized aluminum. The person skilled in the art is aware that the oxide layer created by the anodizing process is produced by a transformation of the uppermost layer of aluminum into oxide or hydroxide. The term "coating" used here is thus to be understood in the broadest sense and includes both a layer of the material of the platform or bottom plate created by anodizing processes and a coating deposited by a coating process, such as a galvanic coating process, on the material of the platform or bottom plate.

In many embodiments the entire device can be formed from the material of the platform or bottom plate, especially aluminum. In other embodiments, the platform or bottom plate can be made of another material. For example, parts of the device, especially a base body of the device, can be made of an inert plastic having a temperature resistance of at least 130° C., in which the platform or bottom plate is incorporated. Exemplary inert plastics with the required temperature resistance are polyetherketone (PEEK) or polyoxymethylene (POM). However, it should be noted that when different materials are combined, special attention must be paid to ensure that the device continues to have the above described flatness of the platform or bottom plate, i.e., the above described flatness zone of the device.

Furthermore, in the choice of all materials of the device or incubation chamber special attention should be paid so that the materials have suitable sturdiness under the operating conditions of the device. As already mentioned, the material of the device should on the one hand be resistant to the sometimes highly reactive reaction solutions and on the other hand stand up to strongly fluctuating temperature effects.

In the device according to the disclosure, the volume of the capillary gap can be kept surprisingly low. Thus, the above described techniques and methods for the study of the biological material placed on the slide can be carried out successfully and efficiently with a surprisingly small amount of the liquids used. For example, the device may be designed such that the capillary gap can be filled with a liquid volume of at least 50 µl, such that a parallel capillary gap can be formed extending over the entire active surface of the slide. In general, the required liquid volume for the filling of the capillary gap should be between 50 µl and 400 µl, advantageously between 50 µl and 150 µl.

Moreover, the bottom plate of the device according to the disclosure may be designed such that it can provide an effective limiting of the capillary gap volume. In particular, the bottom plate may have an edge which can border on the catchment or overflow basin. Thanks to the aforementioned forces of adhesion in the capillary gap, this edge can form a limit line for the expanding liquid meniscus when the capillary gap is filled with an adequate volume of liquid. This effect can be intensified in that the edge of the bottom plate is configured as an elevation. A liquid volume which does not significantly exceed the designed volume of the capillary gap may represent an adequate liquid volume here. Furthermore, the platform or bottom plate may have an overflow lip, in order to direct any excess liquid from the capillary gap into the catchment or overflow basin.

The catchment or overflow basin of the device can likewise be used to provide a slight amount of a nonreactive liquid, such as water, in the incubation chamber, so that the vapor atmosphere can be created for the most part by the evaporation or volatilization of the nonreactive liquid. In especially advantageous manner, an edge of the bottom plate defines a boundary line for the meniscus of the liquid present in the capillary gap. In the device according to the disclosure, the capillary gap can be bounded by the edge of the bottom plate, so that a separation edge can be formed for the liquid present in the capillary gap.

As already mentioned, the precise limitation of the liquid expanding in the capillary gap within the device or the incubation chamber may significantly reduce risk of contamination. For example, it can be ensured that only the active surface of the slide comes into contact with the respective reaction solutions. A contamination of the labeling portion of the slide, on the other hand, can be prevented. This can significantly lessen the risk of contamination with possibly mutagenic, carcinogenic, or otherwise toxic liquids and reagents for the user of the device and the person handling the slide.

A device according to the disclosure can be a closable incubation chamber, in which a slide with biological material is placed and can be moved according to the disclosure, so that all process stages of a research protocol can be carried out as efficiently and economically as possible, such as a research protocol for an immunohistochemical (IHC) tissue staining, an in situ hybridization study of a BioChip staining. In particular, the reaction solutions necessary to the respective stages of the process can be introduced into the incubation chamber, as well as be removed entirely once again, so that the slide can remain during the entire protocol in the incubation chamber. In this way, mechanical influences in particular can be prevented from acting on the biological material during the performance of the research protocol. Furthermore, especially detrimental mechanical abrasions of the biological material of the slide by manual or automated transporting of the slide during the research protocol are for the most part prevented.

Thanks to the design of the incubation chamber according to the disclosure, moreover, the disposal of the reaction solutions/reagents used in the chamber can furthermore be advantageously facilitated. In particular, the chamber can make possible the complete removal, especially the aspirating, of certain of the reaction solutions used in the chamber, without these being mixed with other solutions used in previous or subsequent process stages. This can advantageously guarantee, for example, a prescribed separation and/or disposal of the resulting chemical wastes. Furthermore, reaction solutions suitable for this can be effectively recycled.

The fact that the slide can remain in the chamber during all process stages can furthermore significantly lessen the risk of contamination of the immediate surroundings, especially for a user of the chamber with one of the reaction solutions. Even under circumstances in which the capillary gap of the chamber is overfilled, the risk of contamination remains low for the user, since the excess liquid is collected in an overflow basin. Since the platform or bottom plate can be configured such that the excess liquid can be conveyed into the overflow basin, it can furthermore be assured that only the active surface of the slide, but not the labeling portion, is wetted with the reactive liquids. In this way, the risk of contamination for the user can be further lowered. Moreover, thanks to the collecting of excess liquid in the overflow basin, a spreading of the liquids placed in the chamber into the moving arrangement can be prevented. In this way, it is possible to prevent the moving arrangement from being exposed to detrimental effects of the liquids. Furthermore, time-consuming cleaning of the moving arrangement can be reduced to a minimum, which besides the obvious time savings may further have the advantage of preventing premature wear and tear.

As already described, the device according to the disclosure may include an outlet for the liquid, which stands in a fluidic connection with the only one corner region of the slide which is not raised or is only slightly raised in the collecting position. In this way, the liquid can be removed from the device through the outlet. In a device according to the disclosure which can be designed as an incubation chamber, the outlet can be formed as a suction nozzle led through the lid of the chamber. The suction nozzle may be anchored in the lid so that when the lid is closed it can be brought into a predetermined position of the incubation chamber, associated with the corner region of the slide. In particular, the suction nozzle may be designed such that in the closed condition of the incubation chamber it can enter into a form-fitting and friction-locking connection with the corner region of the slide which is not raised or is only slightly raised in the collecting position and/or it can present a further abutment to the slide, which assists the tilting movement of the slide into the collecting position. The suction nozzle can be made from a deformable material such as rubber of silicone, so that the form-fitting and friction-locking connection of the suction nozzle to the slide is tight. Thus, it can be assured that a partial vacuum can be generated in the suction nozzle. In order to ensure the fluidic connection between the liquid present in the capillary gap and the opening of the aspiration canal running through the suction nozzle, at least a partial region of this aspiration opening can protrude beyond the surface of the slide facing toward the suction nozzle. Advantageously, the suction nozzle may be arranged in the incubation chamber such that the aspiration opening surrounds the corner of the corner region of the slide which is not raised or only slightly raised in the collecting position.

For example, the end of the suction nozzle impinging on the slide may be everted in the shape of a funnel or trumpet, so that the suction nozzle by the closing of the lid of the incubation chamber can be brought into a form-fitting and friction-locking connection with the corner region of the slide. The funnel or trumpet-shaped everted end of the suction nozzle may be configured such that on the one hand a fluidic connection can be created between the liquid present in the capillary gap and the aspiration opening of the suction nozzle and on the other hand the form-fitting and friction-locking connection can make possible the creating of a partial vacuum in the suction nozzle.

Alternatively, the end of the suction nozzle impinging on the slide may be provided with a cavity, which can receive the corner region of the slide that is not raised or only slightly raised in a form-fitting and friction-locking connection. Furthermore, the corner of the slide may protrude into the aspiration opening of the suction nozzle, so that by closing the lid of the incubation chamber on the one hand a fluidic connection can be created between the liquid present in the capillary gap and the aspiration opening of the suction nozzle and on the other hand the form-fitting and friction-locking connection can make possible the creating of a partial vacuum in the suction nozzle.

All geometrical configurations of a suitable suction nozzle enabling a form-fitting and friction-locking connection of the suction nozzle to the slide, so that a partial vacuum can be generated in the suction nozzle, are conceivable.

The outlet may be designed such that it can be connected to at least one aspiration element. In particular, the aspiration element may be part of an aspiration system for the separate disposal of the liquids placed in the capillary gap.

Depending on the design of the suction nozzle, the aspiration canal can contain an aspiration element, especially a pipette tip or a pipetting needle, so that the liquid can be removed or aspirated through the suction nozzle and across the pipette tip or pipetting needle from the incubation chamber. Alternatively, the aspiration element may be an aspiration hose. The aspiration canal may lead through the lid of the incubation chamber. In such embodiments, the aspiration canal is usually in a straight line.

In alternative embodiments, the aspiration canal may have a bend which allows a removing or aspirating of the liquid from the incubation chamber not through the lid of the incubation chamber but instead through a side wall of the base body. In particular, for example, the aspiration canal may go to a leadthrough in a side wall of the base body. The leadthrough may be designed such that it can accommodate an aspiration hose. By closing the lid of the incubation chamber, the aspiration canal can be placed in a form-fitting and friction-locking connection with the aspiration hose.

In embodiments in which the aspiration canal leads through the lid of the incubation chamber and can be connected to an aspiration hose, the aspiration hose must be so flexible and movable that the lid of the incubation chamber can be opened and closed entirely without limitation.

In embodiments in which the aspiration canal leads through a side wall of the base body and can be connected to an aspiration hose, a flexible or movable design of the aspiration hose is not absolutely necessary. This may bring design benefits. This is so in particular when the device according to the disclosure is configured as an incubation chamber for use in an automatic staining machine.

In the device according to the disclosure, the slide is movable into a mixing position not parallel to the platform. The mixing position can be a position between the reaction position and the collecting position in which the space between slide and platform forms a fluidic connection between a mixing zone of the device and the corner region of the slide not raised or only slightly raised only in the collecting position. Reagents which are introduced into the mixing zone can flow through the fluidic connection to the corner region not raised or only slightly raised as soon as the slide is moved into the mixing position. By repeatedly moving the slide from the mixing position to the collecting position, the reagents can be thoroughly mixed, thereby providing a liquid for wetting of the biological material.

This is especially advantageous, since the liquid for the wetting of the biological material may be a highly reactive and short-lived liquid, which must be prepared from two or more components immediately before its use. for example, the liquid may be a substrate solution for an enzymatic reaction. However, such substrate solutions are often unstable and may decompose in a short time and are often only usable in a small time window after their preparation. Owing to their short life (short shelf life), lengthy mixing processes and/or standing times for such liquids after their preparation should be avoided.

With the device according to the disclosure, such liquids can advantageously be prepared directly in the device and thus immediately prior to their use. For example, a 3,3'-diaminobenzidine (DAB) solution and a hydrogen peroxide-containing buffer solution can be placed in the mixing zone for the purpose of then mixing them by use of repeated movement of the slide from the collecting position to the mixing position into a DAB-peroxidase substrate solution for the wetting of the biological material. By the further movement into the reaction position, the DAB-peroxidase substrate solution can be brought into contact with the biological material immediately after its preparation.

Furthermore, the mixing position may advantageously be chosen such that the reagents being mixed do not come into contact with the biological material during the mixing process. The skilled person will understand that in the case of a slide on which the biological material has been placed in a large area a steeper mixing position closer to the collecting position should be chosen if a contact of the reagents with the biological material is to be prevented. In this case, it may be required to increase the number of movements between the mixing position and the collecting position in order to assure a complete mixing of the reagents. On the other hand, the mixing position may be further away from the collecting position the further is the biological material from the corner region on the active surface of the slide that is not raised or only slightly raised in the collecting position. In order to avoid a contact of the reagents being mixed and the biological material, the mixing zone can be arranged such that it can be associated with a first edge of the slide, while the first edge on the one hand is part of the corner region of the slide which is not raised or is only slightly raised and on the other hand it is further away from the biological material than the second edge of the corner region which is not raised or is only slightly raised.

The above indicated problem is furthermore solved by a method as claimed herein. In particular, it has been discovered that, with the use of the device according to the disclosure, a method can be carried out for the wetting of biological material with at least one liquid that optimizes the introducing and removing of the liquids needed for the wetting and thus solves the above indicated problem.

Furthermore, a method is provided for mixing at least two liquid reagents using the device according to the disclosure. This further method may include the following stages:
  (a) Introducing the liquid reagents into a mixing zone of the device while the slide is situated in the collecting position;
  (b) Moving the slide from the collecting position to a mixing position not parallel relative to the platform, wherein the mixing position is a position between the reaction position parallel to the platform and the collecting position not parallel to the platform, and wherein, in the mixing position, the space between the slide and the platform can form a fluidic connection between the mixing zone and a corner region of the slide which is not raised or is only slightly raised only in the collecting position by which the reagents can flow into the corner section;
  (c) Complete mixing of the reagents by repeatedly moving the slide from the mixing position to the collecting position, wherein a liquid for wetting the biological material is provided by the complete mixing of the reagents; and
  (d) Moving the slide into the reaction position so that the liquid from stage (c) can wet the biological material.

As already mentioned above, the non-parallel mixing position can be chosen such that the reagents do not come into contact with the biological material during stages (a) to (c) of the method. For example, the at least two reagents may be a 3,3'-diaminobenzidine (DAB) solution and a buffer solution containing hydrogen peroxide, so that the liquid prepared by the complete mixing of the two reagents can be a DAB-peroxidase substrate solution.

It is pointed out that the above discussed features of the device according to the disclosure may also have a method counterpart. A combination of these features with the features regarding the method claims is of advantage and is explicitly part of the disclosure.

Now, there are various ways of configuring and modifying the teaching of the present disclosure in advantageous manner. For this, reference is made on the one hand to the claimed devices and methods and on the other hand to the following discussion of exemplary embodiments of the disclosure with the aid of the drawing, which also serve to describe the method according to the disclosure. In connection with the discussion of exemplary embodiments of the disclosure with the aid of the drawings, embodiments and modifications of the teaching are discussed. The drawings show FIG. 1 in a schematic perspective representation, an exemplary embodiment of a device according to the disclosure in which the slide is in the collecting position, FIG. 2 the device according to the disclosure per FIG. 1, in which the slide is in the reaction position, FIG. 3 the device according to the disclosure per FIGS. 1 and 2 in the closed condition, FIG. 4 in a schematic perspective representation, a moving device of a device according to the disclosure, FIG. 5 in a schematic perspective representation, a moving arrangement of a device according to the disclosure, FIG. 6 in a schematic perspective representation, a single-piece base body of a device according to the disclosure, FIG. 7 in a schematic representation, a further exemplary embodiment of a device according to the disclosure in the closed condition, FIG. 8 in a schematic perspective representation, a further exemplary embodiment of a device according to the disclosure in the closed condition, FIG. 9 in a schematic perspective representation, a multi-piece, especially a three-piece base body in interlocking connection with a moving arrangement of a device according to the disclosure, FIG. 10 in a schematic perspective representation, a coupling element of a multi-piece base body of a device according to the disclosure, FIG. 11 in a schematic perspective representation, a further exemplary embodiment of a device according to the disclosure, in which the slide is in the collecting position, FIG. 12 in a schematic perspective representation, a moving device of a device according to the disclosure, FIG. 13 in a schematic perspective representation, an outlet of a device according to the disclosure, FIG. 14 in a schematic perspective representation, a portion of a device according to the disclosure in an enlarged cutout view, FIG. 15 in a schematic perspective representation, an outlet of a device according to the disclosure, and FIG. 16 in a schematic perspective representation, an aspiration system which can be connected to the outlet of the device according to the disclosure.

Figure 17:
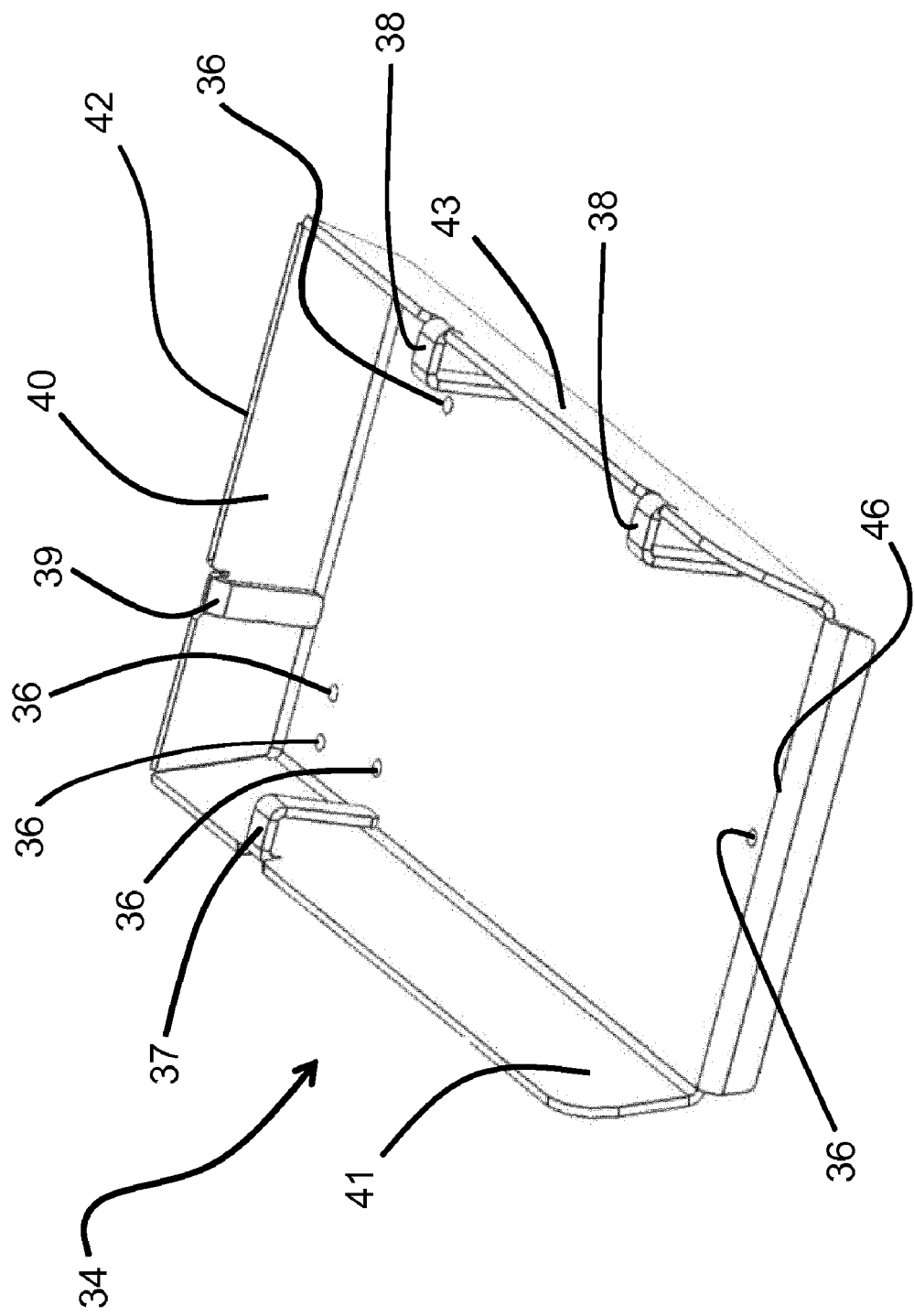

FIG. 17 in a schematic perspective representation, a platform for use in a device with a multi-piece base body designed as an incubation chamber.

Figure 18:
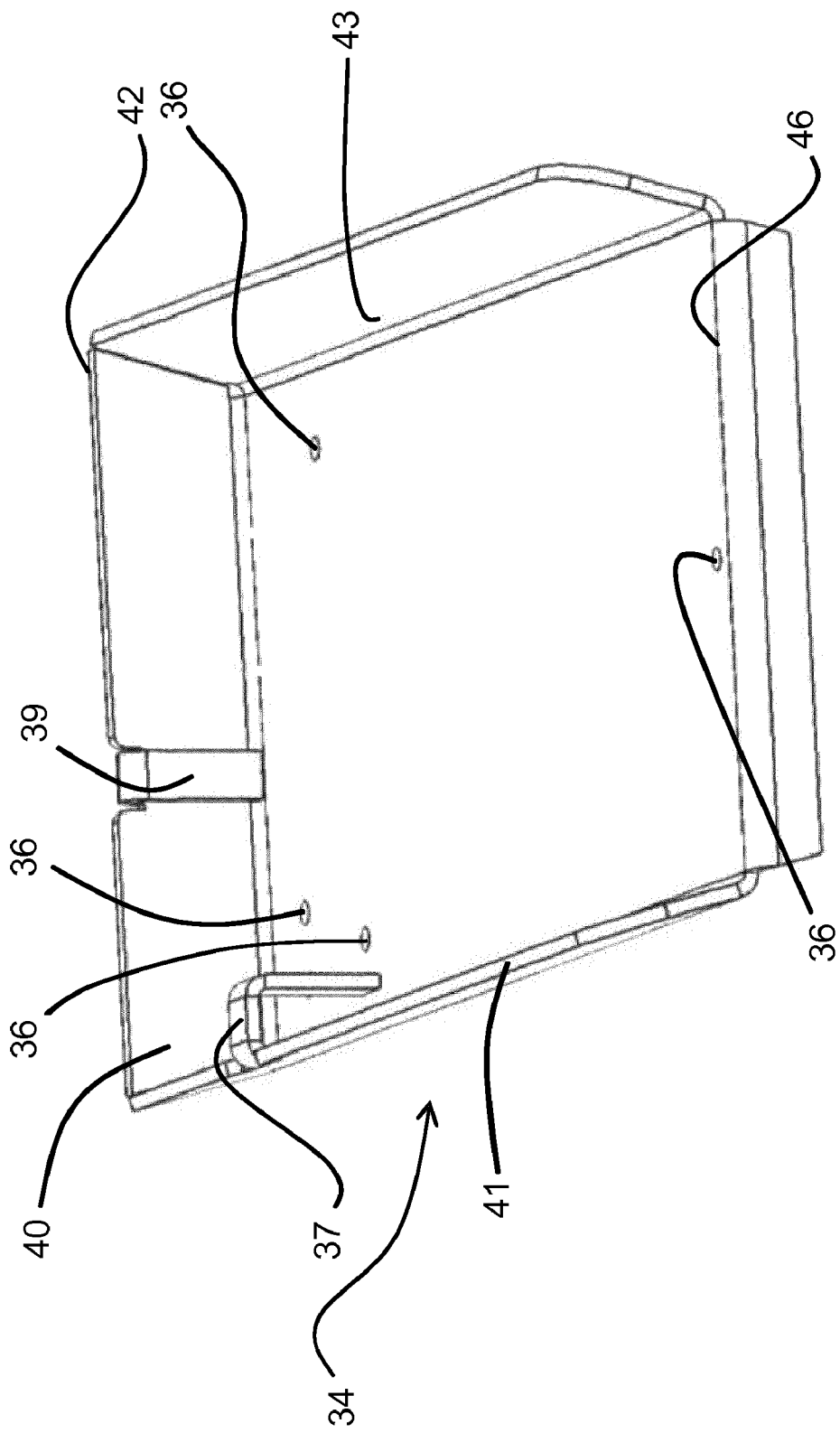

FIG. 18 in a schematic perspective representation, a platform for use in a device with a multi-piece base body designed as an incubation chamber.

Figure 19:
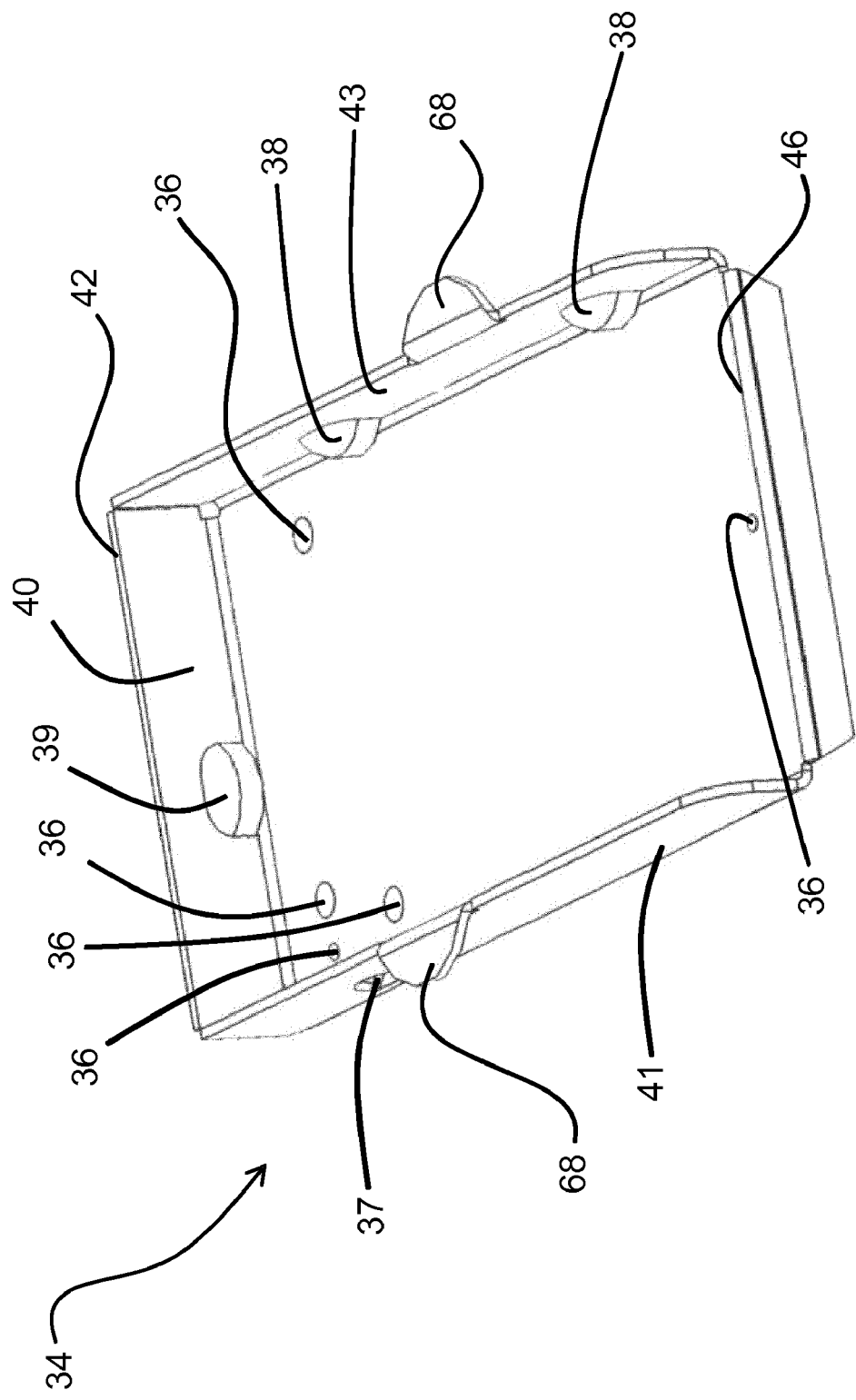

FIG. 19 in a schematic perspective representation, a platform for use in a device with a multi-piece base body designed as an incubation chamber.

Figure 20:
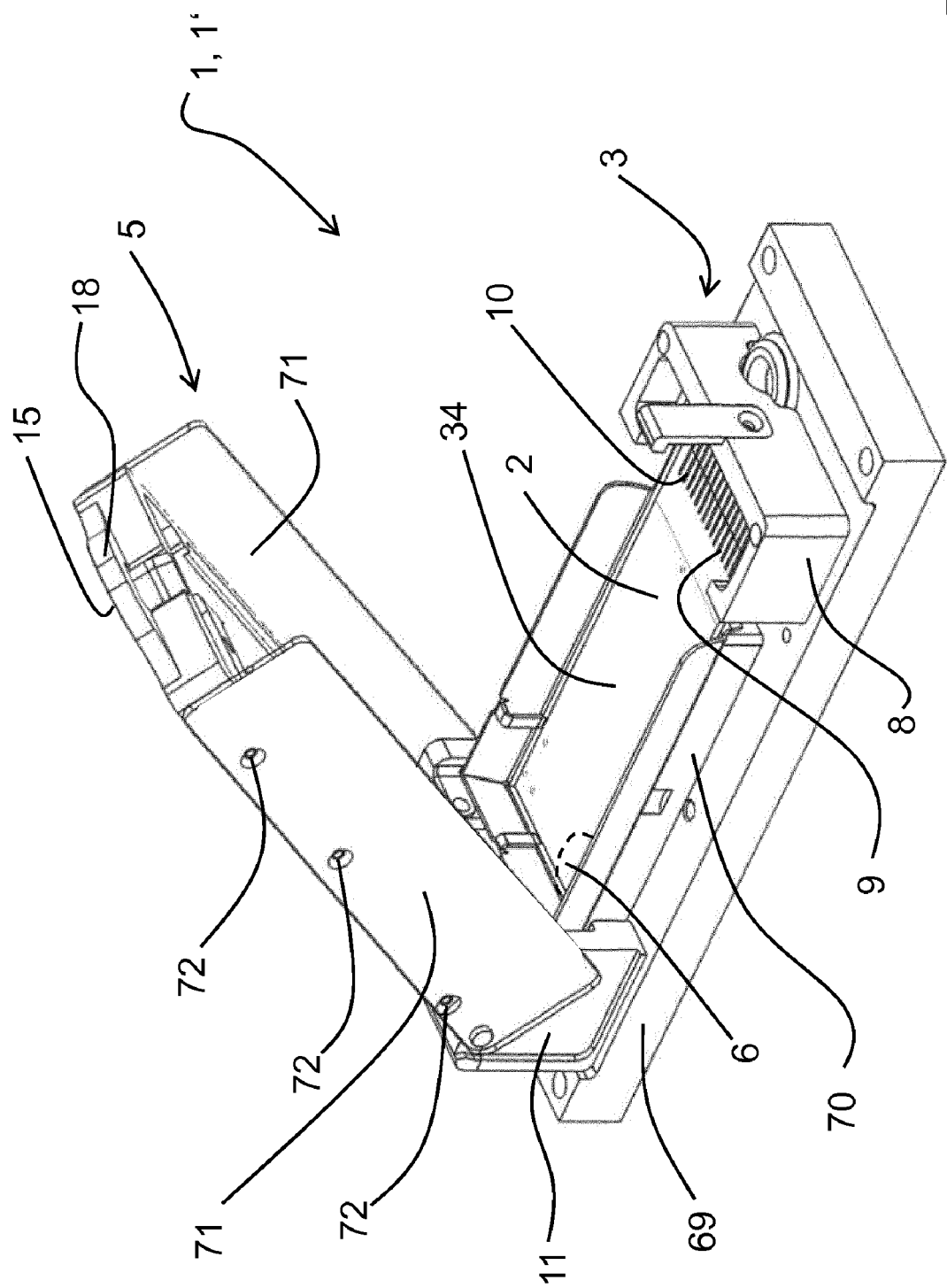

FIG. 20 in a schematic perspective representation, a further exemplary embodiment of a device according to the disclosure, in which the slide is in the reaction position.

Figure 21:
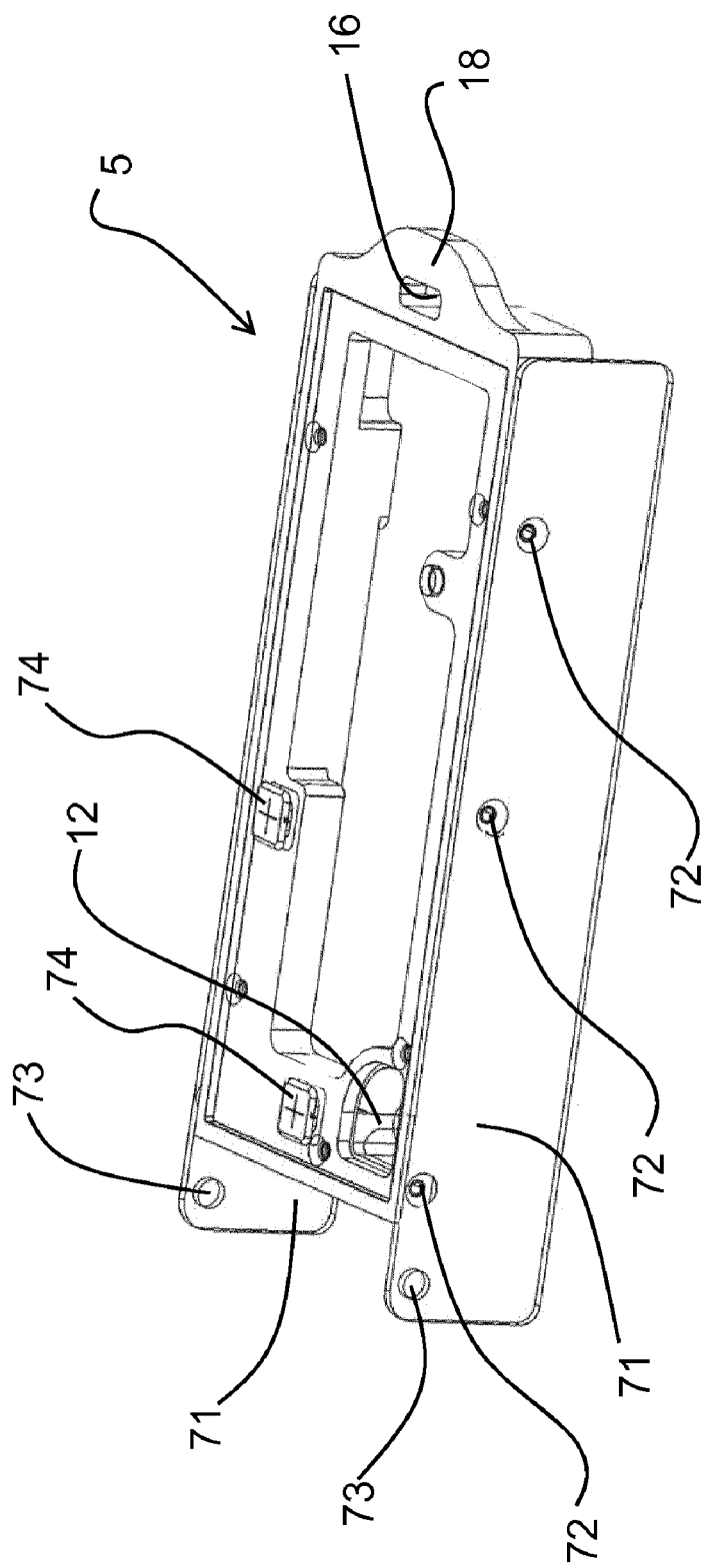

FIG. 21 in a schematic perspective representation, a lid with elongated side walls.

FIG. 1 shows a device 1 according to the disclosure, which is configured as an incubation chamber 1' for a slide 2. The incubation chamber 1' includes a moving arrangement 3, a single-piece base body 4 with a platform to receive the slide 2 and a lid 5. The platform lies in the indicated incubation chamber 1' beneath the slide 2 and is thus not visible in FIGS. 1 and 2. The incubation chamber 1' serves for the wetting of biological material, which is placed on the active surface of the slide 2, with at least one liquid, and it is suitable in particular for immunohistochemical studies, in situ hybridization studies, tissue staining, biochip staining or the like of the biological material, especially of tissue or cell sections.

As shown in FIG. 1, the slide 2 is moved within the incubation chamber 1' into a collecting position, in which a corner region 6 of the slide 2 is not raised or only slightly raised, so that a liquid for wetting the biological material placed on the slide 2 collects in this corner region 6. The moving arrangement 3 includes a moving device 7, which is designed as a rocker 7', and a rocker housing 8. The slide 2 has at one end a labeling section 9 with a barcode 10 and lies by this end against the rocker 7'.

The device 1 of the disclosure which is configured as an incubation chamber 1' is represented with open lid 5, which can be secured by a holding block 11 on a base plate designed for this purpose and not shown in FIG. 1. The lid 5 further includes an outlet 12, which is designed as a suction nozzle 12' and can be anchored in the lid 5. The end 13 of the suction nozzle 12' impinging on the slide 2 is everted in the shape of a funnel or trumpet and when the lid 5 is closed it is pressed against the corner region 6 of the slide 2, so that a partial vacuum can be created in the suction nozzle 12'. In the collecting position of the slide 2, the suction nozzle 12' stands in a fluidic connection with the corner region 6 thanks to the connection with the slide 2, so that the liquid for wetting the biological material can be fully aspirated by the vacuum created in the suction nozzle 12'. Furthermore, the lid 5 includes several abutments 14, which can enter into contact with the surface of the slide 2 facing away from the support 24 of the rocker 7' when the lid 5 of the incubation chamber 1' is closed, so that the movement of the slide 2 from the reaction position to the collecting position is assisted. In the closed condition of the incubation chamber 1', a saturated atmosphere can be created in the chamber, especially by thermal action, by thermal action across the platform or bottom plate of the base body 4.

In the lid 5 there is provided a closure 15 by which the base body 4 is connected to the moving arrangement 3. For this, the closure 15 has a receiving region 16 for a latching element 17. Since normally both the rocker housing 8 and the holding block 11 are secured on a base plate, the closure 15 upon closing of the lid 5 not only latches the base body 4 relative to the rocker housing 8, but also relative to the base plate. The closure 15 is outfitted with a gripping lip 18, which may facilitate the opening and closing of the lid 5 for the user. All other design configurations of a lid closure which can provide the described functions are conceivable.

Thanks to the latching of the incubation chamber 1' relative to the base plate, the platform or bottom plate of the base body 4 can be positioned exactly and advantageously on a temperature element underneath, for example on a hot plate or on a heating block. Furthermore, the platform or bottom plate of the base body 4, depending on the configuration of the receiving region 16 of the closure 15 and the corresponding latching element 17, can be positioned with friction locking on the temperature element. This allows an effective and precise heat transfer from the temperature element across the platform or bottom plate of the base body 4 into the capillary gap between the slide 2 and the platform or bottom plate 34.

Furthermore, the lid 5 of the incubation chamber 1' includes a barcode reading window 19, which in the closed condition can be associated with the labeling section 9 of the slide 2 resting against the rocker 7', so that the barcode 10 can also be read through the lid 5 in the closed condition of the incubation chamber 1'. The barcode reading window 19 may consist of a transparent plastic, which deflects the corresponding laser or infrared beams for the reading of the barcode little or not at all, so that the barcode is readable.

Furthermore, the lid 5 includes at least one leadthrough 20 for the introducing of liquids into the closed incubation chamber 1'. For example, a staining process of the biological material requires multiple replacement of reagents. In order to avoid having to open the lid 5 for the reagent replacement, the reagents can be placed in the incubation chamber 1' through the leadthrough 20 in the lid 5 at the side of the slide 2. In order to maintain the saturated atmosphere in the closed incubation chamber 1', the leadthrough 20 must be closed on the one hand, and on the other hand it must allow a penetration by a pipette tip or pipetting needle and then close up again after the liquid has been introduced. For this, the leadthrough 20 may be provided for example with a silicone closure having a cross slot, which spontaneously seals itself after withdrawing the pipette tip or pipetting needle. Alternatively, the closure may be designed as a closable cover, which can at first be shoved to the side by the pipette tip or pipetting needle and then closes itself spontaneously after the withdrawal of the pipette tip or pipetting needle by virtue of an elastic pretensioning. If the lid has multiple leadthroughs for the introducing of liquids into the closed incubation chamber 1', the closure options described for the leadthrough 20 are likewise conceivable for the other leadthroughs.

Figure 2:
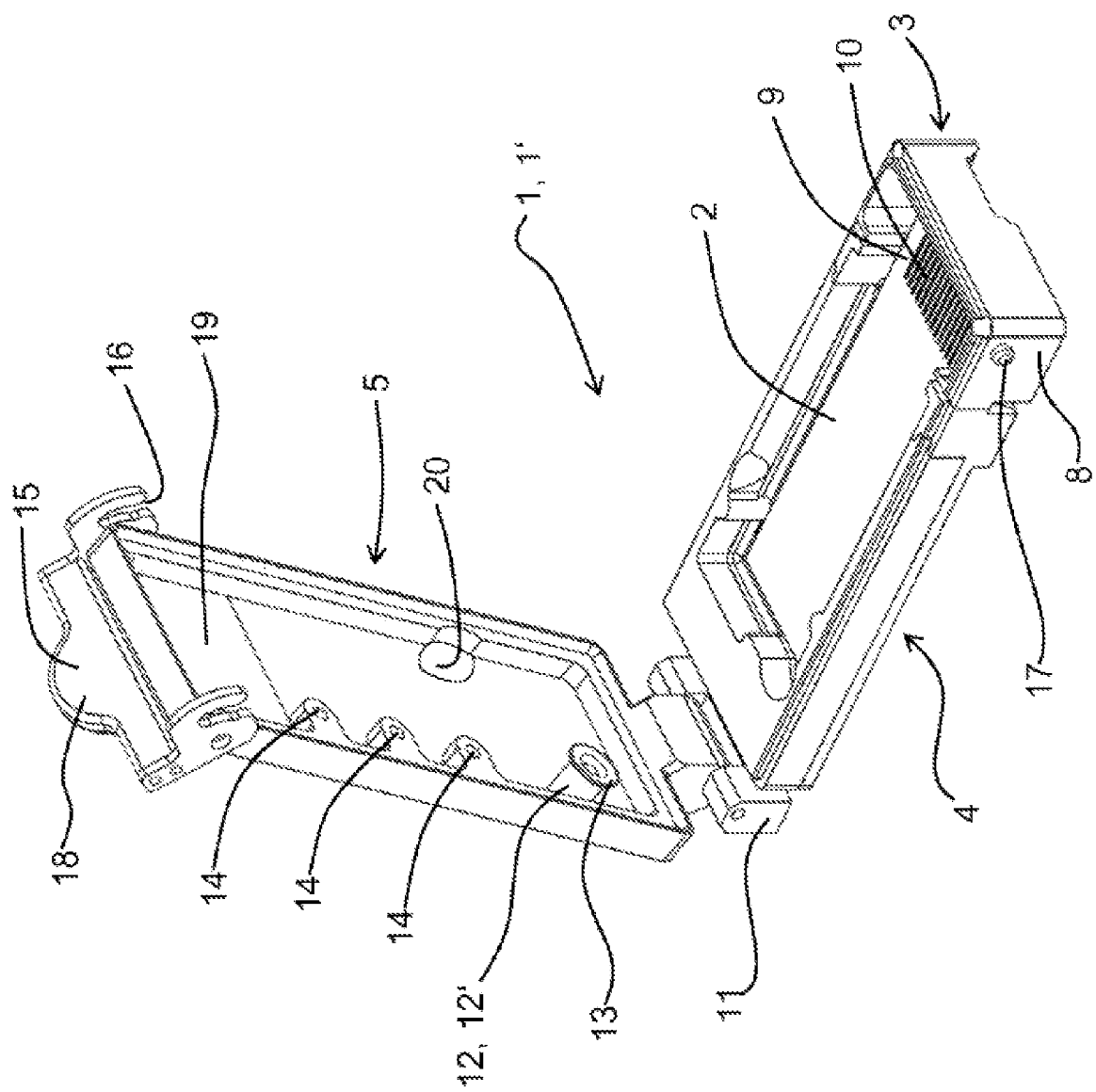
Figure 3:
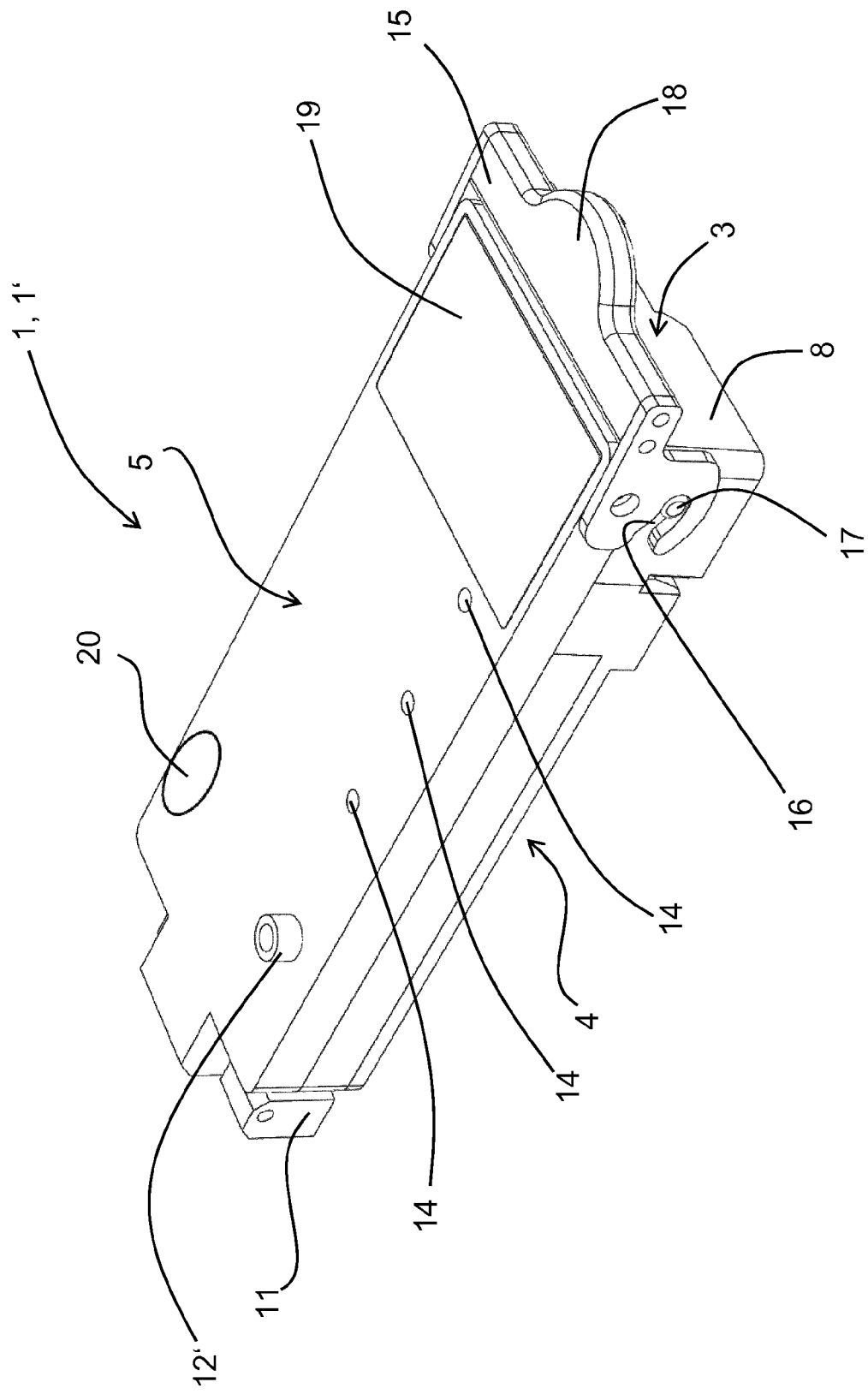

FIG. 2 shows the incubation chamber 1' of FIG. 1, where the slide 2 is in the reaction position. For this, the rocker 7' (not visible) has been lowered. FIG. 3 shows the incubation chamber 1' of FIGS. 1 and 2 in the closed condition. To avoid repetition regarding FIGS. 2 and 3, refer to the description of FIG. 1.

Figure 4:
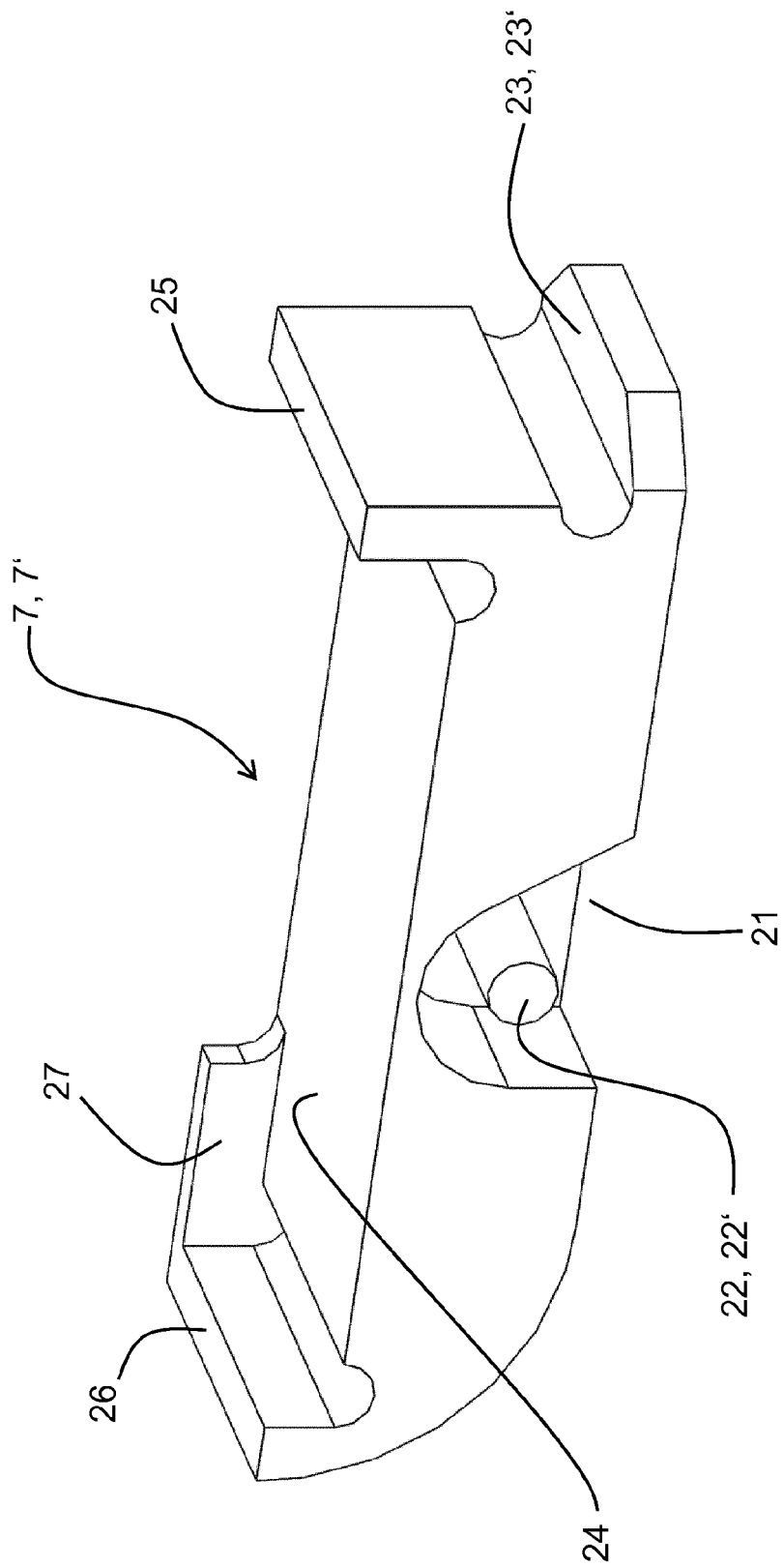

FIG. 4 shows the moving device 7 of the moving arrangement 3, which is configured as a rocker 7'. The rocker 7' may include a receiving region 21 for a lifting device, such as a plunger. The plunger may be anchored in the receiving region 21 by an anchoring element 22, such as the pin 22', so that the moving device 7 configured as a rocker 7' can be moved from the bottom up into a raised position and be placed in a tilted position. In the raised position of the rocker 7', at least two corner regions of the slide 2 are not raised or are only slightly raised, while the slide 2 in the tilted position finds itself in the collecting position. When being placed in the tilted position, an anchoring member 23 of the rocker 7' configured as an abutting lip 23' can make contact with a corresponding anchoring surface of the device 1, such as an anchoring surface of the rocker housing 8, so that the rocker 7' rotates from the raised position into the tilted position. The anchoring surface of the rocker housing 8 may be formed as a material protrusion, for example, serving as an end stop for the abutting lip 23'. The slide 2 resting on the support 24 turns about its longitudinal axis due to the raising of the rocker 7' and at the same time slides somewhat toward the lowered side of the rocker 7'. A first rocker side wall 25 can limit the sliding movement of the slide 2. The first rocker wall 25 is somewhat taller than the second, opposite rocker wall 26, so that in the closed incubation chamber 1' it can push against the lid 5 if the abutting lip 23' should lose contact with the corresponding anchoring surface of the rocker housing 8 during an especially strong tilting of the rocker 7'. Thus, the pushing of the first rocker wall 25 against the lid 5 may form a further abutment, which can assist the tilting movement of the rocker 7' and thus the movement of the slide 2 into the collecting position.

Figure 5:
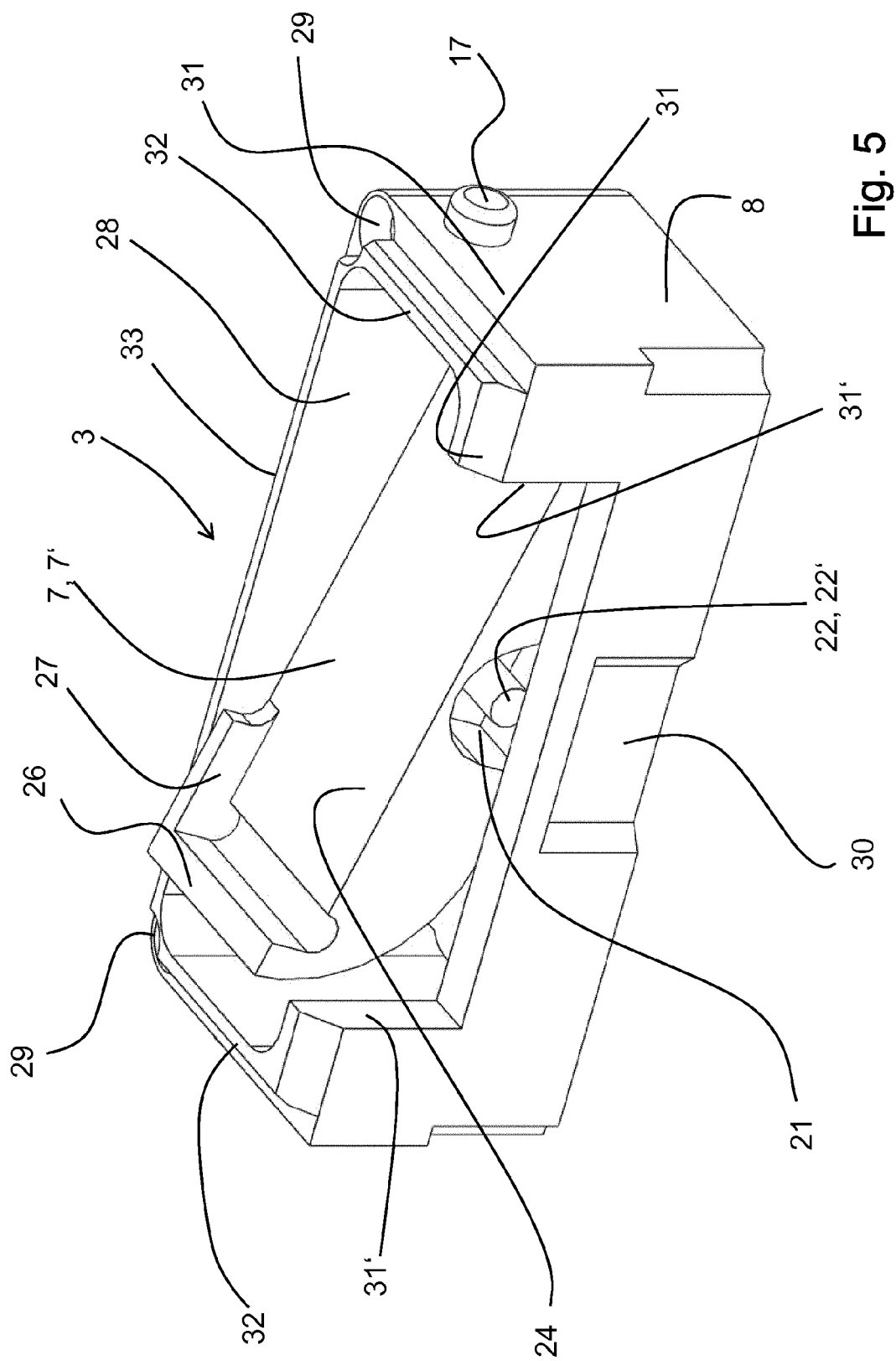

In FIG. 5 the rocker 7' is shown in the tilted position in the rocker housing 8, which can be connected to the base body 4 of the incubation chamber 1'. The tilting movement of the slide 2 in the closed incubation chamber 1' can also be assisted by the abutment 14, as already described above. Thanks to the abutment 14, the tilting movement of the slide 2 against the forces of adhesion acting in the capillary gap can be assisted. The rocker 7' is furthermore provided with a rear wall 27, which prevents the slide 2 from touching the front inner wall 28 of the rocker housing 8 and becomes jammed with it during the lowering process. The rocker housing 8 can be secured at fixation points 29, for example by use of screws, to a base plate of an instrument or machine. Thanks to the securing of the rocker housing 8 to a base plate, the base body 4 can be arranged stationary with respect to the base plate upon closing of the closure 15. For this purpose, the rocker housing 8 has a positioning element, configured as an indentation/bulge 30, and it can receive a corresponding positioning element of the base body 4. The encircling walls 31, 32 and 33 of the rocker housing 8 are configured such that they can be connected to a corresponding indentation of the lid 5.

Figure 6:
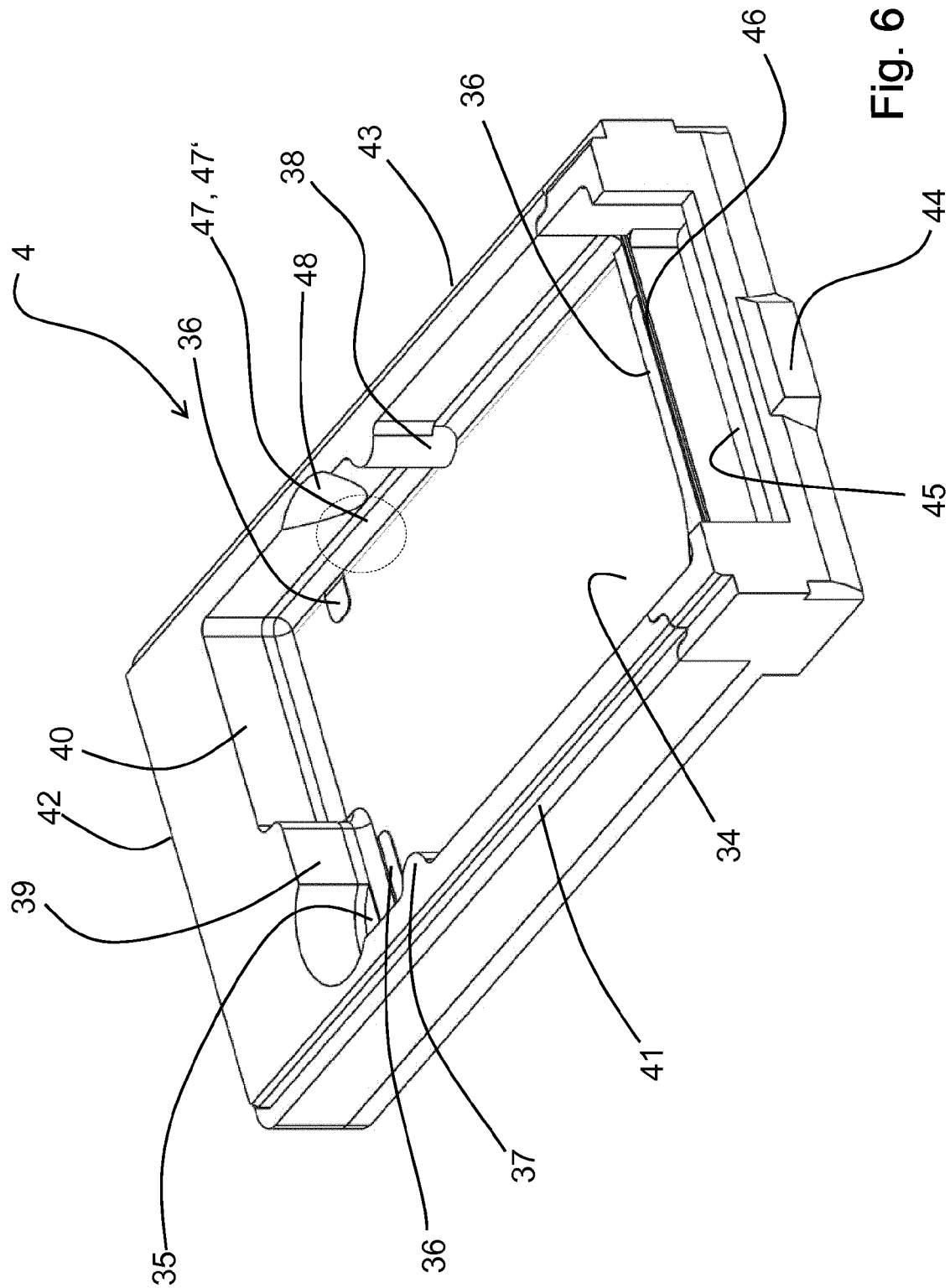

In order to limit the slippage of the slide 2 on the support 24, the inner sides 31' of the encircling wall 31 of the rocker housing 8 may be appropriately spaced apart from each other, like corresponding side boundary elements of the base body 4. Likewise, the inner sides of the rocker walls 25 and 26 can limit a sideways slippage of the slide 2. FIG. 6 shows a single-piece base body 4 of the device configured as an incubation chamber 1'. The base body 4 includes the platform or bottom plate 34, which consists of an inert material, or is at least coated with an inert material on the side facing toward the slide 2. The bottom plate 34 is an inert sheet of polyimide, especially Kapton, or polyetherketone (PEEK), or a coated aluminum plate.

In the reaction position of the slide 2, a capillary gap is formed between the slide 2 and the platform or bottom plate 34, which can be filled by the liquid for wetting the biological material placed on the slide 2. The movement of the slide 2 by the moving arrangement 3 allows a targeted guidance of the liquid into the corner region 6, which is associated with a suction location 35 of the base body 4. By repeated movement of the slide 2 from the reaction position to the collecting position, without the liquid being aspirated via the suction nozzle 12' from the corner region 6 at the suction location 35, the liquid in the capillary gap can be mixed, bubbles can be removed from the capillary gap, and/or the biochemical reactions in the capillary gap can be accelerated. The base body 4 includes spacers 36 for forming the capillary gap and for regulating the volume of the capillary gap. The spacers 36 may in particular have a height relative to the platform or bottom plate 34 of 0.05 mm to 0.2 mm. Furthermore, the base body 4 includes boundary elements 37, 38, 39, which can limit the sideways movement or slippage of the slide 2 in the incubation chamber 1'. For example, the boundary element 39 can prevent the possibly sharp-edged slide 2 from sticking to the inner rear wall 40 of the base body 4 when it is moved from the reaction position to the collecting position, which would impair the movement of the slide 2.

As already mentioned, the closing of the lid 5 can exert a direct pressure on both the encircling walls 41, 42, 43 of the base body 4 and on the encircling walls 31, 32, 33 of the rocker housing 8, resulting in an indirect pressure on the platform or bottom plate 34 of the base body 4. The indirect pressure assists the most direct possible heat transfer from a temperature element located beneath the platform or bottom plate 34 to the platform or bottom plate 34.

The base body 4 includes a positioning element configured as a material protrusion 44, which can be connected to the indentation/bulge 30 of the rocker housing 8. Furthermore, the base body 4 includes an overflow basin 45. A wall of the overflow basin 45 defines a separation edge 46 for the liquid in the capillary gap, so that the liquid can flow into the overflow basin 45 only if the capillary gap is overfilled.

Furthermore, the base body 4 shown in FIG. 6 has a region 47 where liquids can be introduced. The region 47 may stand in fluidic connection with the outlet 12 of the device 1, via the capillary gap. The base body 4 has a further bulge 48, associated with the region 47, which can facilitate the introducing of a liquid into the region 47, for example by pipetting. The region 47 may also be situated in other locations in other embodiments of the device 1 of the disclosure. However, if the region 47 also functions as a mixing zone 47' in a method according to the disclosure, it should be arranged in the base body 4 such that a fluidic connection between the region 47 and the corner region 6 can be formed in a non-parallel mixing position of the slide 2. In this way, reagents which are introduced into the mixing zone 47' and which flow through the fluidic connection into the corner region 6 can be mixed thoroughly by repeated movement of the slide 2 from the collecting position to the mixing position. The liquid for wetting the biological material can be prepared in this way. For example, a 3,3'-diaminobenzidine (DAB) solution and a buffer solution containing hydrogen peroxide can be introduced into the mixing zone 47', so that a DAB-peroxidase substrate solution for the wetting of the biological material can be prepared directly in the incubation chamber 1' by a mixing method according to the disclosure.

Figure 7:
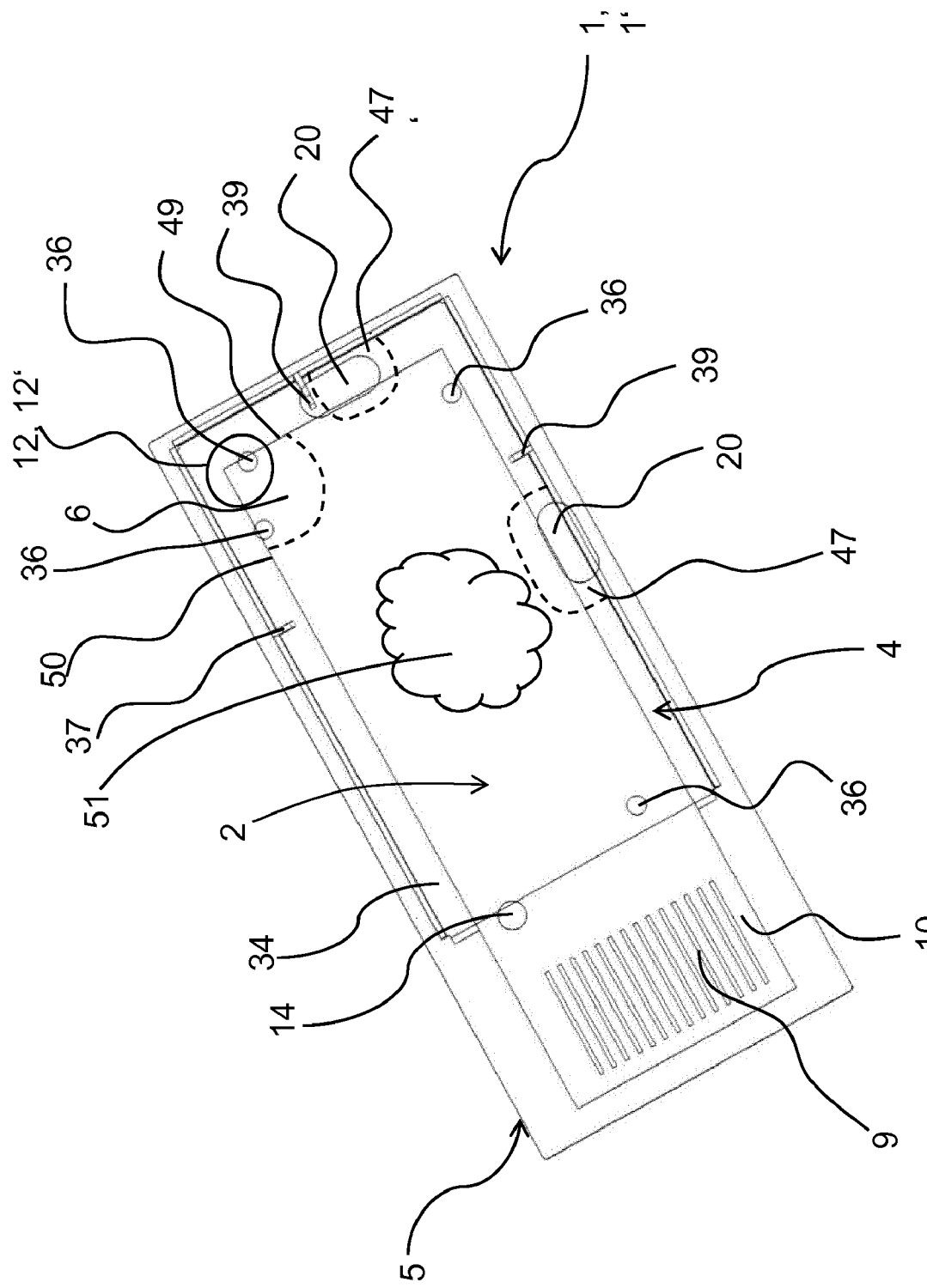

FIG. 7 shows the possible arrangement of the region 47 and the mixing zone 47' relative to the slide 2 in the closed device 1 of the disclosure. For clarity, only selected features of the incubation chamber 1' are shown, especially for the lid 5, the slide 2 and the base body 4. Furthermore, for clarity, both the lid 5 and the slide 2 are represented in see-through fashion, so that features underneath can be seen in the figure.

In particular, FIG. 7 shows a leadthrough 20' associated with the mixing zone 47' for the introducing of liquids to be mixed into the incubation chamber 1'. The mixing zone 47' can be arranged such that it is associated with the first edge 49 of the slide, which on the one hand is part of the corner region 6 of the slide 2 that is not raised or only slightly raised and on the other hand is further away from the biological material than the second edge 50 of the corner region 6 that is not raised or only slightly raised. This ensures that a contacting of the reagent being mixed with the biological material 51 placed on the underside of the slide 2 can be prevented during the mixing. To avoid repetition, refer to the preceding remarks about FIGS. 1 to 6 for a description of the further features indicated in FIG. 7.

Figure 8:
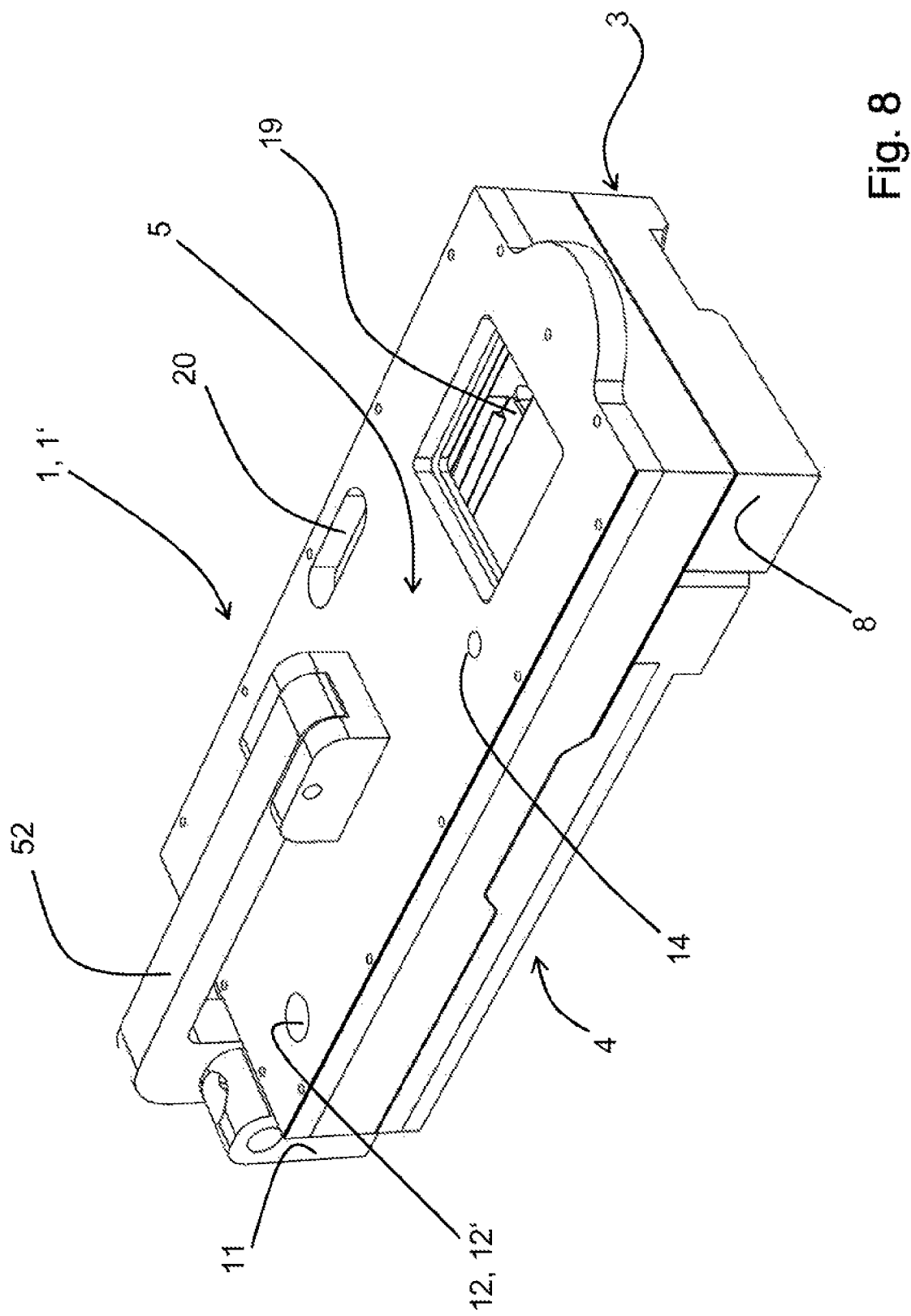

FIG. 8 shows a device 1 of the disclosure configured as an incubation chamber 1' having a design of the lid 5 differing from the incubation chambers of FIGS. 1 to 3. The lid 5 also includes a leadthrough for a suction nozzle 12', an abutment 14, a barcode reading window 19 and at least one leadthrough 20 for introducing liquids into the closed incubation chamber 1'. As for the lid 5 of the incubation chamber 1' shown in FIGS. 1 to 3, multiple leadthroughs are conceivable for the introducing of liquids into the closed incubation chamber 1' for the cover 5 of the incubation chamber 1' shown in FIG. 8, such as those corresponding to the leadthroughs 20 and 20' shown in FIG. 7.

As already described, a pressure exerted through the lid 5 onto the base body 4 allows a platform or bottom plate 34 of the base body 4 to be pressed against a heating element underneath and thus a direct and improved heat transfer can be realized across the platform or bottom plate 34 into the capillary gap. The lid design of FIG. 7 provides this effect by use of a latching arm 52. The latching arm 52 in turn can be secured by a holding block 11 to a base plate of an instrument or machine, not shown. The hinge of the latching arm 52 in the holding block 11 is configured such that it stands under a pretensioning, in order to force the lid 5 into a closed position. This can be accomplished, for example, through a spring in the holding block 11. By the pretensioning of the latching arm 52, the lid 5 of the incubation chamber 1' in the closed condition of the chamber exerts a pressure both on the base body 4 and on the rocker housing 8.

Figure 9:
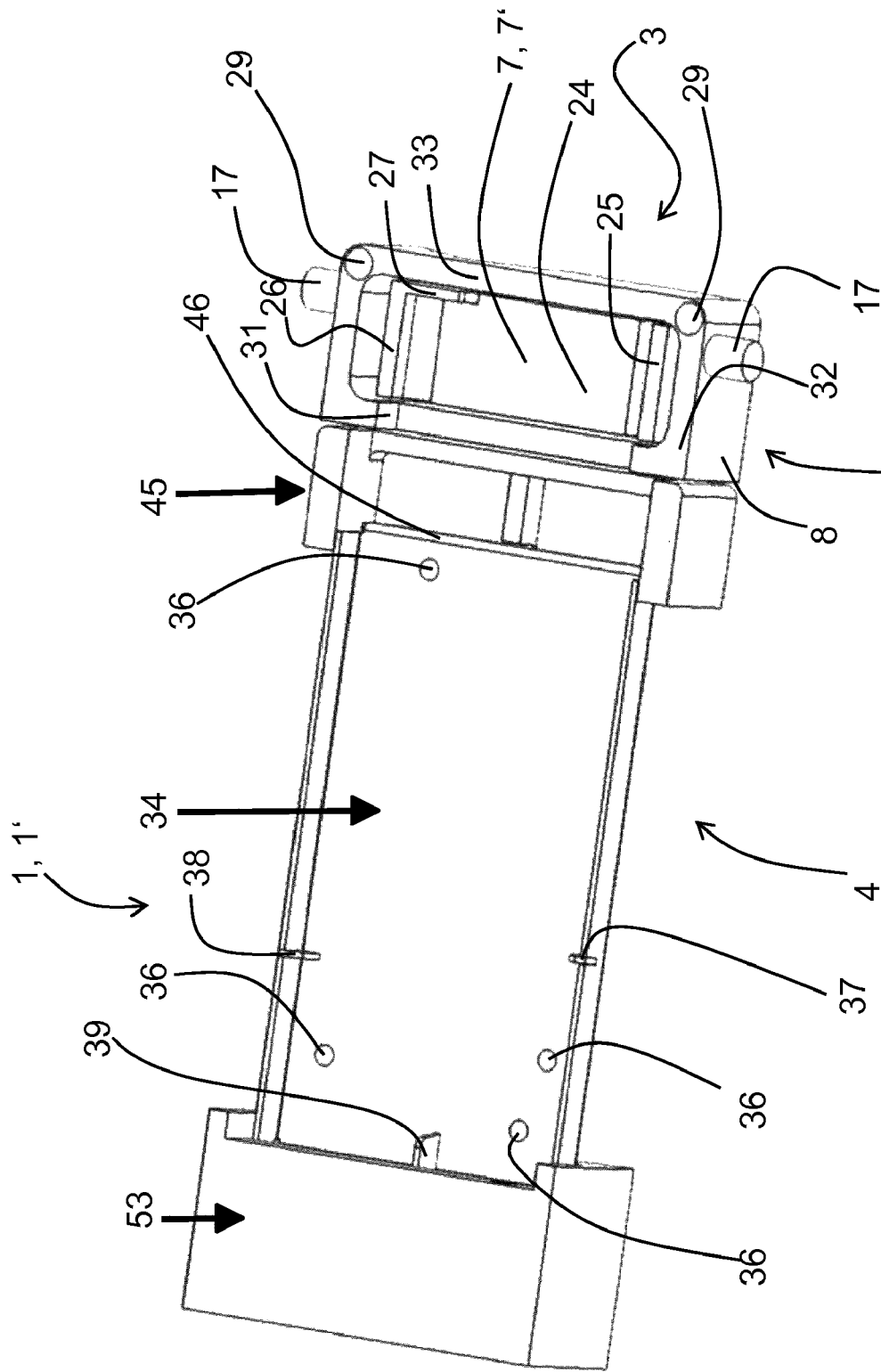

FIG. 9 shows a device 1 configured as an incubation chamber 1' having a multi-piece base body 4. The base body 4 consists of an overflow basin 45, a platform 34 and a coupling element 53. Furthermore, the device 1 shown includes a moving arrangement 3 per FIG. 5. The elements of the multi-piece base body 4 may be joined together and connected to the moving arrangement 3 by the already described design options of the lid 5.

As already mentioned, the platform 34 may be configured as a bottom plate of the device 1. The bottom plate 34 shown in FIG. 9 may be an inert coated aluminum plate, while the spacers 36, the boundary elements 37, 38, 39 and the separation edge 46 may be integral components of the bottom plate 34. This has the advantage that the entire platform 34 can be produced as a single workpiece, which can assure the requisite flatness of the platform 34. In embodiments in which the platform or bottom plate 34 is incorporated into a base body 4, the resulting tensile forces on the platform or bottom plate 34 must be canceled out so that the flatness of the platform or bottom plate 34 remains intact. This is so that, on the one hand, a parallel capillary gap can be formed, and on the other hand so that an efficient and rapid heat transfer remains possible from a temperature element situated underneath the platform or bottom plate 34, such as a heat source, across the platform or bottom plate 34 and into the incubation chamber 1'.

Figure 10:
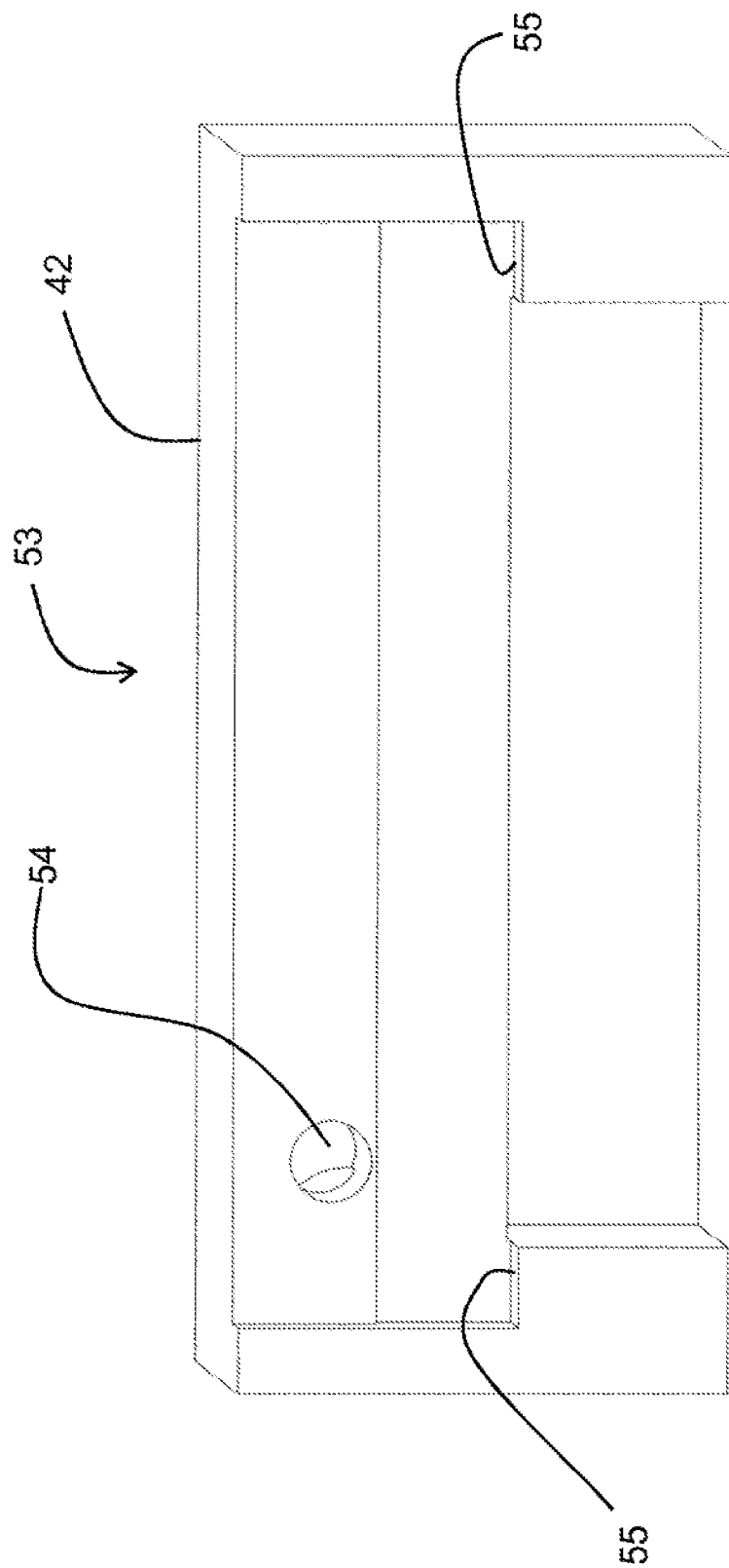

FIG. 10 shows a coupling element 53 of a multi-piece base body 4, in which the aspiration canal 54 of the device 1 is led through the surrounding wall 42 of the base body 4 and can be connected to an aspiration hose. Furthermore, the coupling element 53 has support surfaces 55 for the platform 34, so that it can be joined to the coupling element 53.

Figure 11:
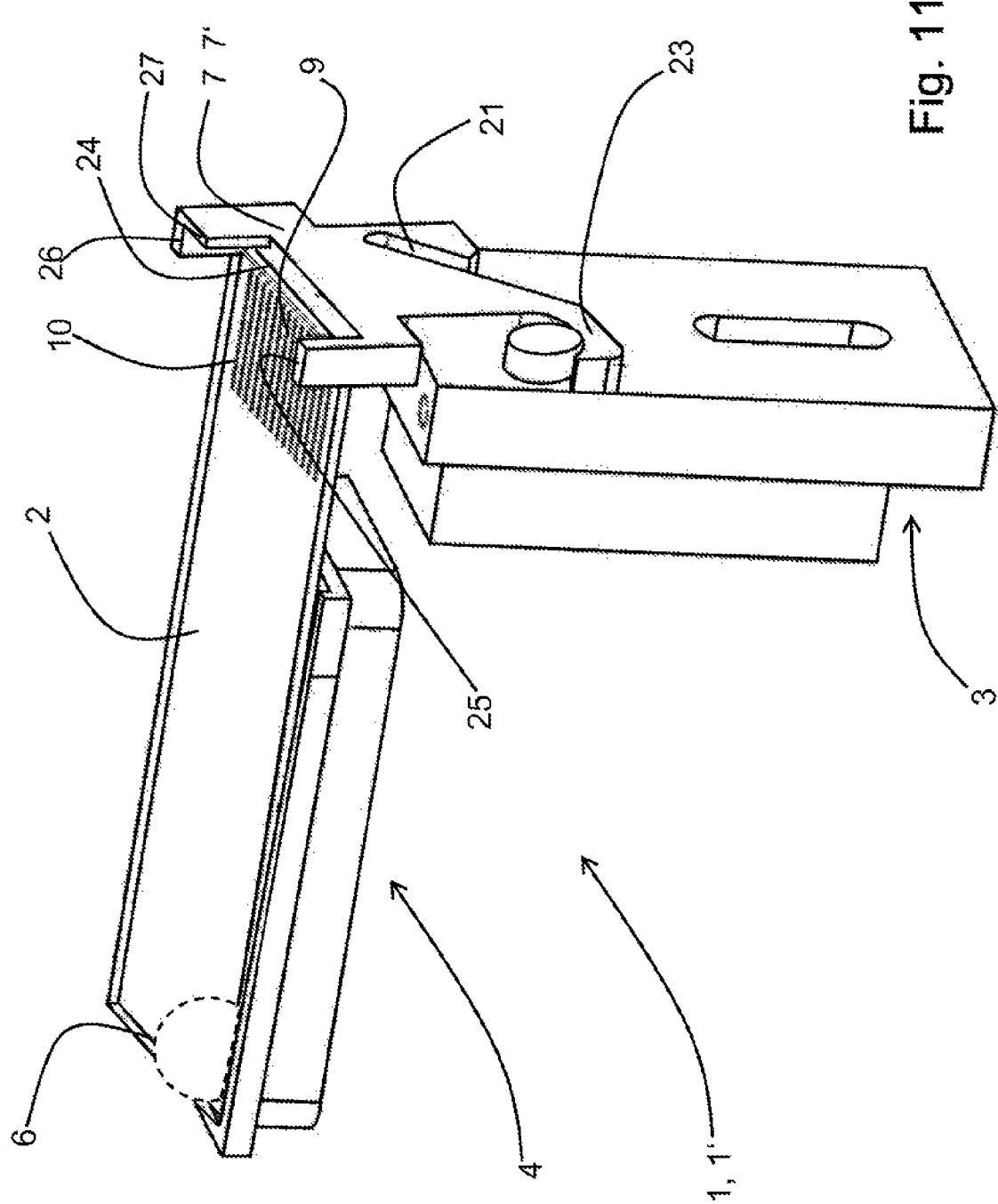

FIG. 11 shows an alternative embodiment of the device 1 of the disclosure, comprising a moving arrangement 3 and a base body 4. Due to the position of the moving arrangement 3 as shown, the slide 2 finds itself in the collecting position. In the embodiment represented here, the rocker 7' has a cavity configured as guide rails, serving as the receiving region 21 for the lifting device. The lifting device, which can be configured as a plunger, can protrude into the receiving region 21 and move the rocker 7' into a movement predetermined by the shape of the guide rails. Thus, the movement of the slide 2 from the reaction position to the collecting position can be accomplished by the shape of the receiving region 21 configured as guide rails. In this way, the liquid in the capillary gap between the slide 2 and the platform 34 can also be moved such that it collects in the corner region 6.

Figure 12:
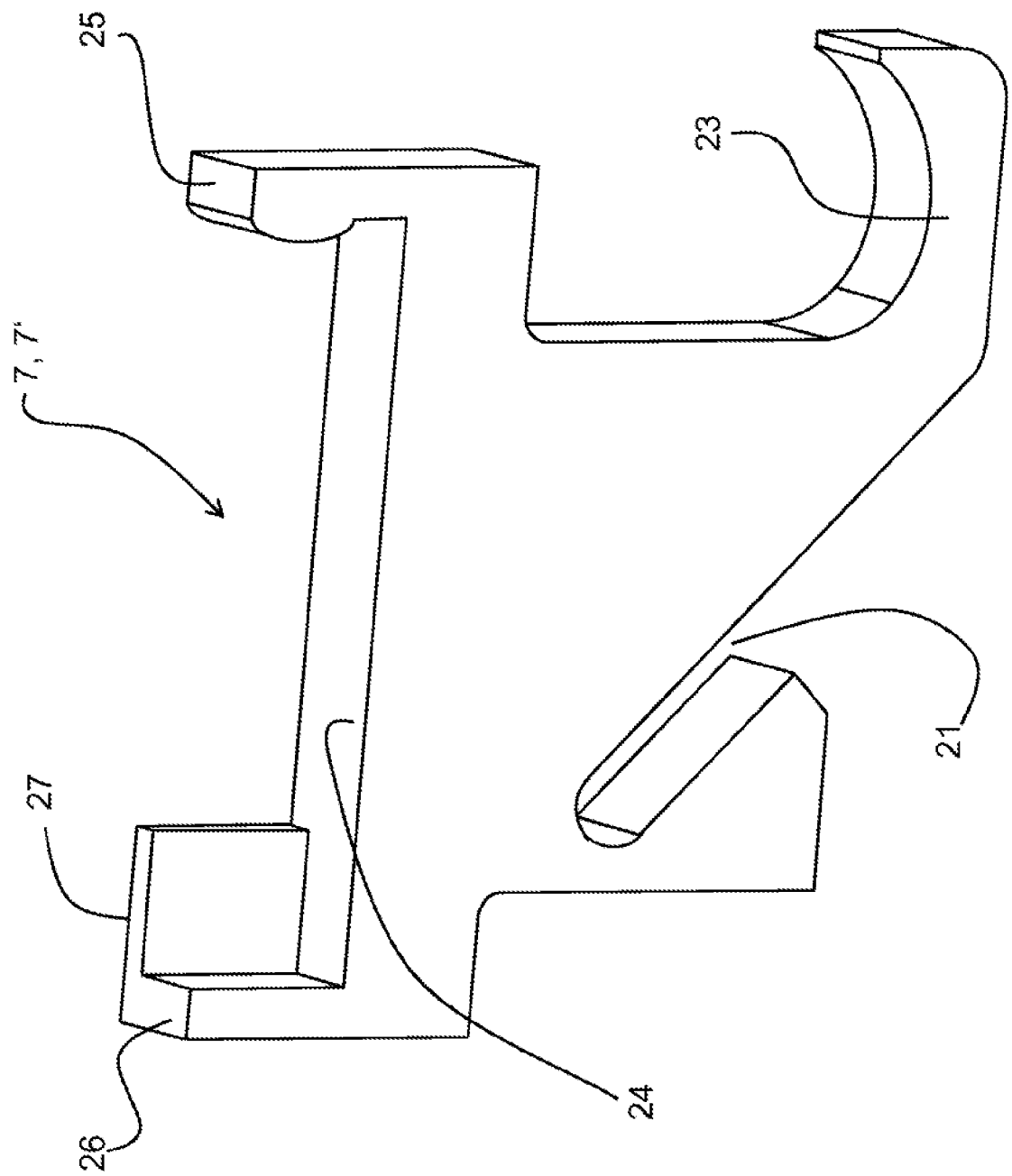

FIG. 12 shows the rocker 7' of the device 1 of FIG. 11 in detail, referring to the description of FIG. 11.

Figure 13:
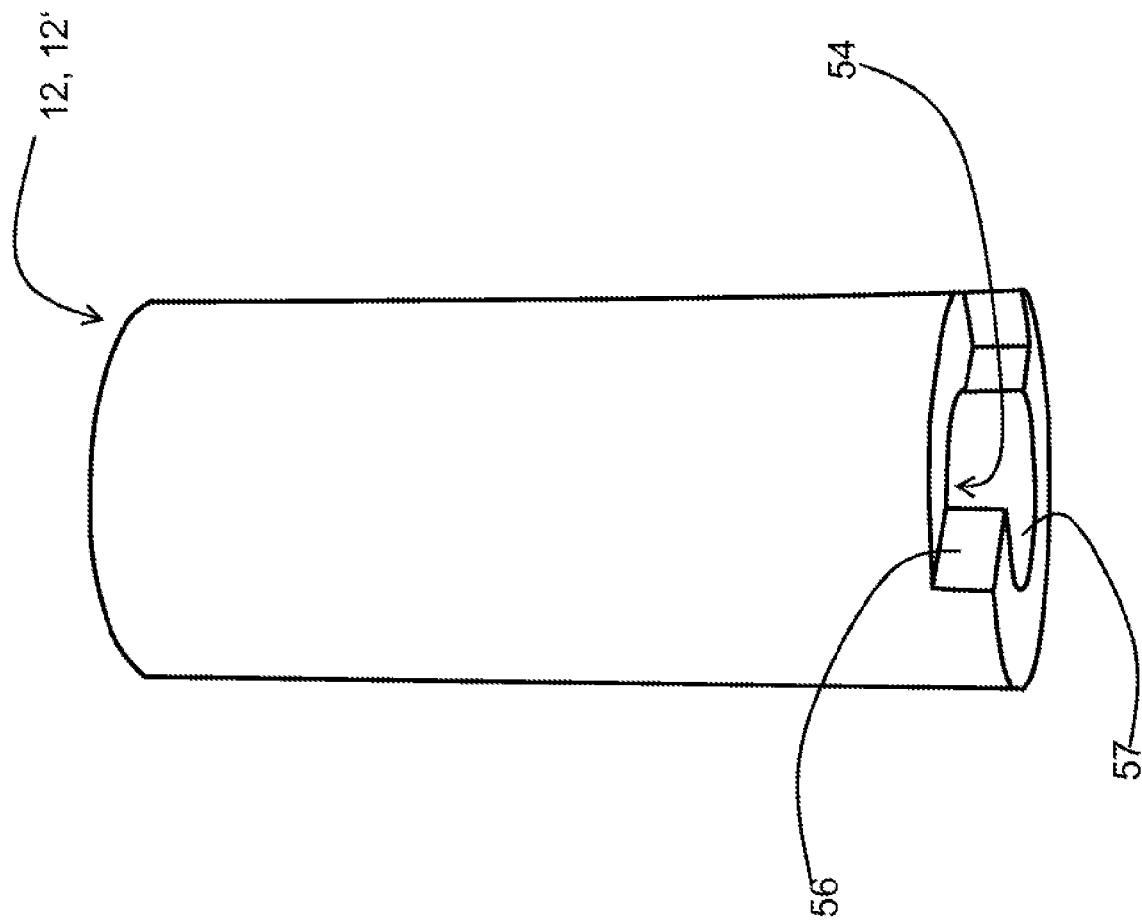

FIG. 13 shows a suction nozzle 12', which is designed such that the aspiration canal 50 is led through the lid 5 of an incubation chamber 1'. The suction nozzle 12' includes a cavity 56 which can receive the corner region 6 of the slide 2. Thus, both the aspiration opening 57 and the aspiration canal 54 of the suction nozzle 12' can be brought into a fluidic connection with the liquid present in the capillary gap.

Figure 14:
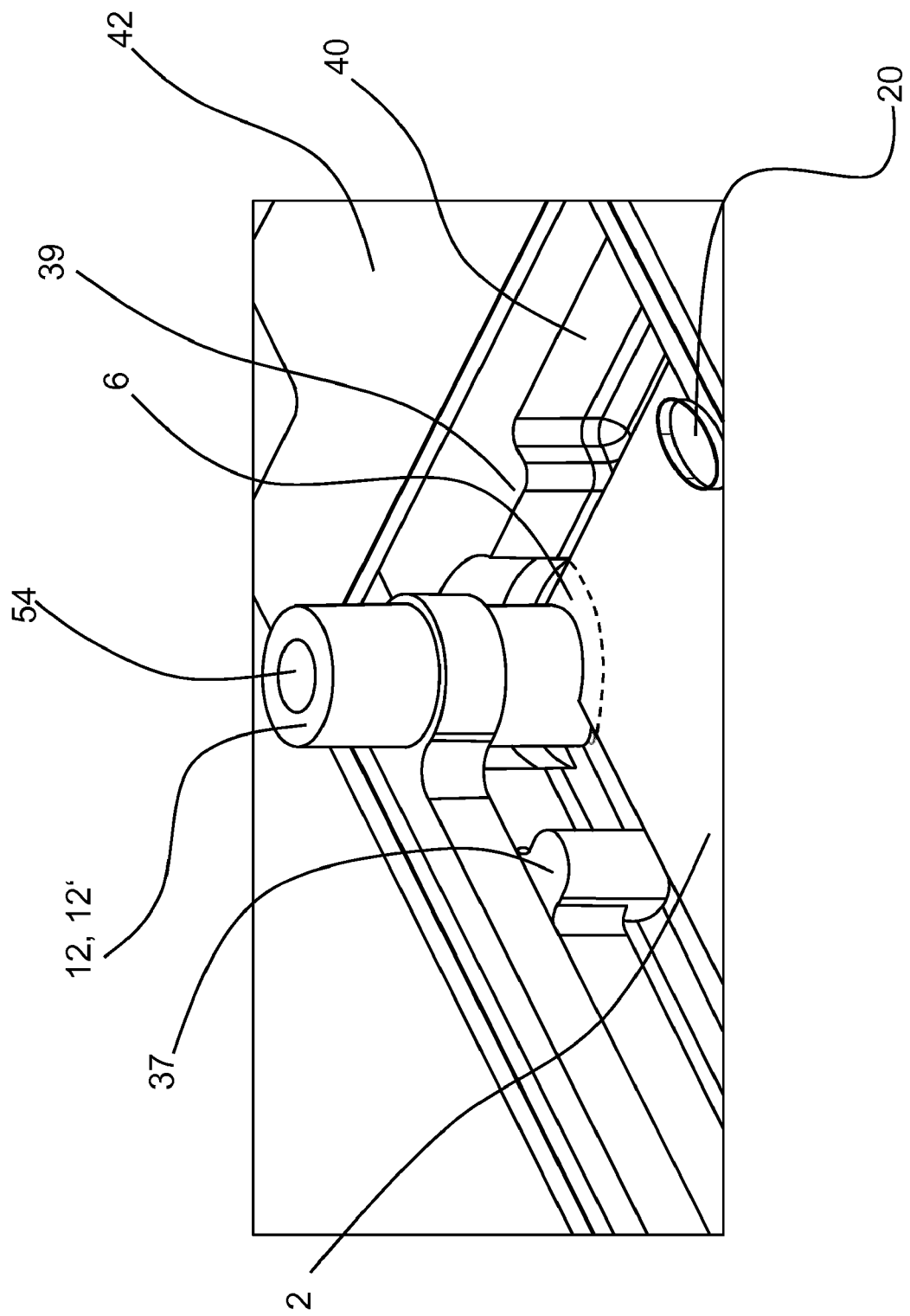

FIG. 14 shows the suction nozzle 12' of FIG. 13 in an aspirating position, which may occur in the closed condition of an incubation chamber 1'. In particular, it is shown how the slide 2 may be present in the incubation chamber 1' and how the cavity 56 may receive the corner region 6 of the slide 2 so that both the aspiration opening 57 and the aspiration canal 54 of the suction nozzle 12' can be brought into a fluidic connection with the liquid present in the capillary gap.

Figure 15:
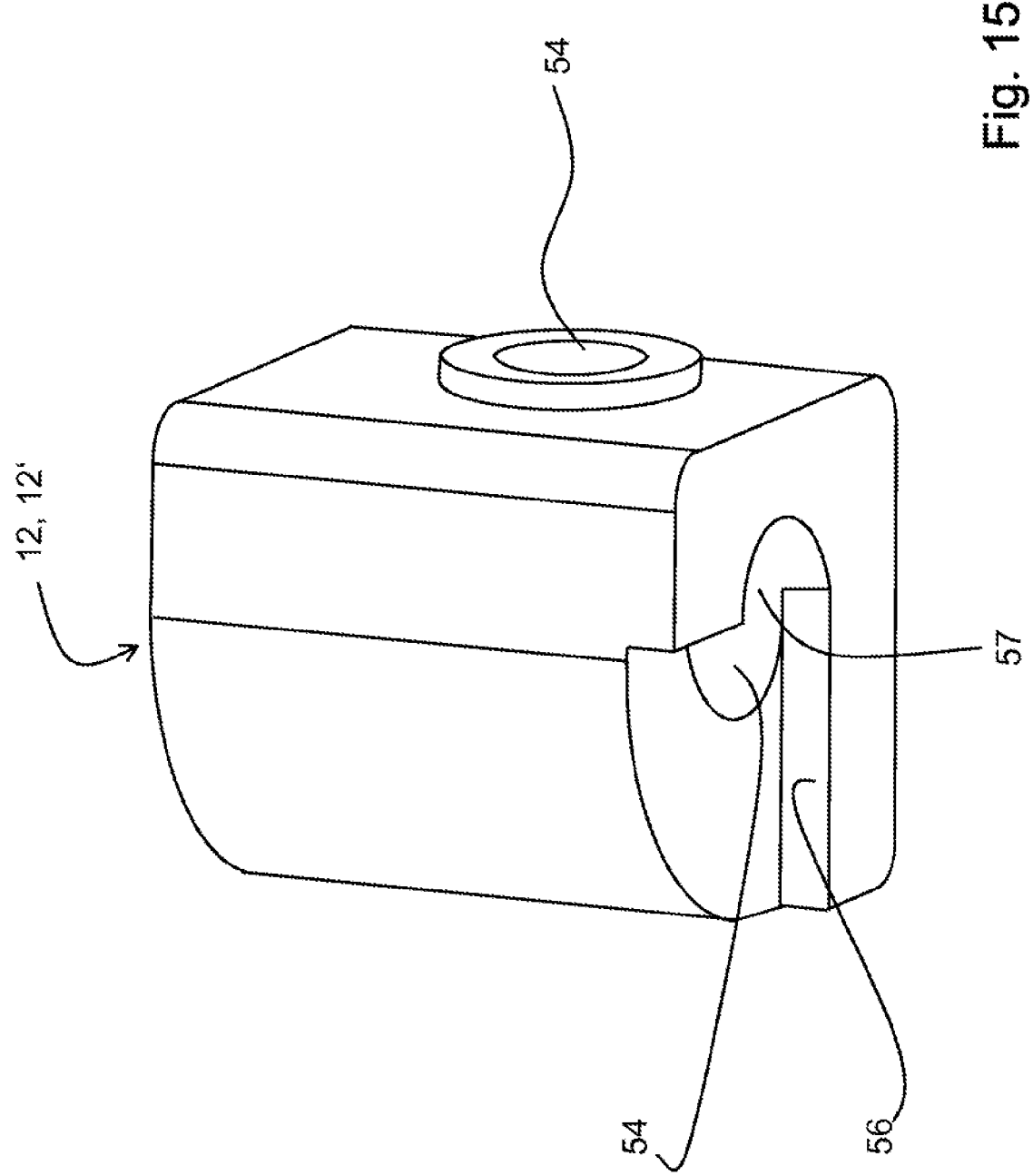

FIG. 15 shows an alternative embodiment of the suction nozzle 12' in which the aspiration canal 54 is led through the surrounding wall 42 of the base body 4. The aspiration canal 54 in the suction nozzle 12 thus has a bend. In embodiments in which the aspiration canal 54 is led through the lid 5 of the incubation chamber 1' (as shown in FIGS. 12 and 13), the aspiration hose must be designed such that the lid 5 of the incubation chamber 1' can be entirely opened and closed without hindrance. In embodiments in which the aspiration canal 54 is led through the surrounding wall 42 of the base body 4 and can be connected to an aspiration hose, a flexible or movable design of the aspiration hose is not absolutely required.

Figure 16:
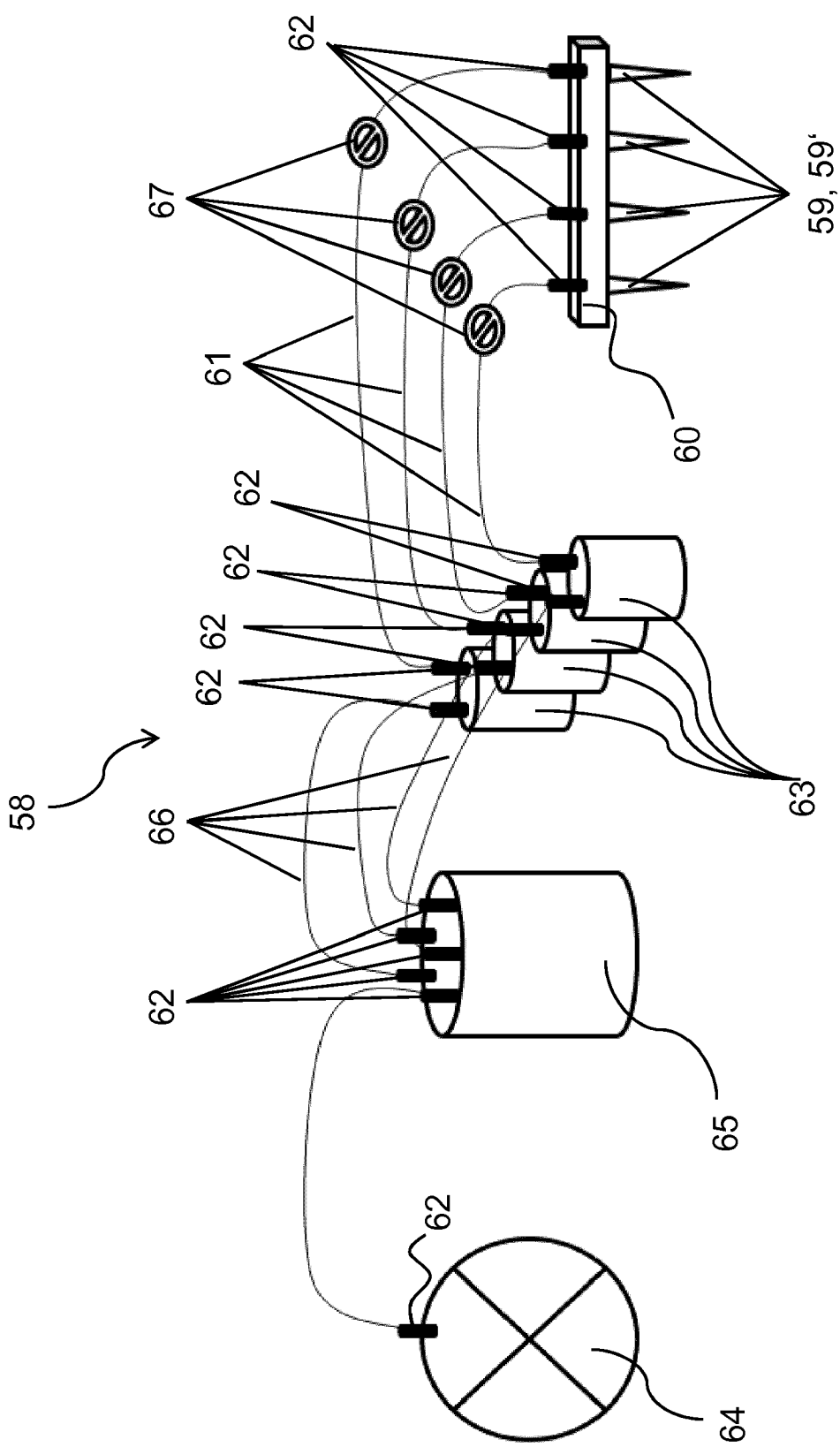

FIG. 16 shows an aspiration system 58 schematically, which can be connected to the outlet 12 or to the suction nozzle 12' across an aspiration element 59. The aspiration element 59 is represented as the pipette tip 59', which can be secured in a pipette tip holder 60. The aspiration system 58 serves for the separate disposal of the liquids used in the capillary gap of the device 1 of the disclosure configured as an incubation chamber 1'. Therefore, as shown, multiple pipette tips 59' can be secured in the pipette tip holder 60, each of them designed to aspirate a liquid from the device 1. The pipette tips 59' are connected to corresponding suction hoses 61, which in turn can be connected by hose olives 62 to a respective refuse container 63. A partial vacuum can be generated in the suction hoses 61 and the refuse containers 63. The vacuum may be generated by a vacuum pump 64 standing in connection with the refuse containers 63. The connection of the vacuum pump 64 to the refuse containers 63 is ensured in the depicted aspiration system 58 by a central pressurized container 65, which in turn can be connected by hose connections 66 to the respective refuse containers 63. Thus, a single vacuum pump 64 can be used to generate a partial vacuum in all the suction hoses 61, making possible the aspiration of the liquids located in the capillary gap via the pipette tips 59'. By selective opening and closing of the valves 67, the aspirating can be done each time by one of the pipette tips 59'. Thus, each time an aspiration element 59 associated with a liquid being aspirated and connected to the corresponding refuse container 63 for this liquid needs to be connected to the outlet 12 or the suction nozzle 12' and the corresponding valve 67 needs to be opened when this liquid is supposed to be removed from the incubation chamber 1'. The aspiration system 58 described here may be part of an automatic staining machine for the device according to the disclosure, and the stages described may be part of an automated method which can take place in concert with the proposed wetting of the biological material 51 placed on the slide 2 situated in the incubation chamber 1'. In this way, not only can the wetting of the biological material 51 be optimized, but so too can the removal of the spent reaction solutions/reagents. In particular, with the proposed device 1 the entire removal, especially the aspiration of the spent reaction solutions is possible, so that a mandated separation and/or disposal of the resulting waste solutions is advantageously possible. Furthermore, with an appropriate design of the aspiration system 58, suitable reaction solutions can be effectively recycled.

FIGS. 17 to 19 show further exemplary embodiments of a platform 34, each of which can be used with a device 1 configured as an incubation chamber 1' and having a multi-piece base body 4.

FIG. 17 shows a platform 34, in which the spacers 36, the boundary elements 37, 38, 39 and the separation edge 46 are integral components of the platform 34. In particular, the boundary elements 37, 38, 39 are formed by a forming process of the material, such as a bending, of the surrounding side walls 41, 42, 43. Thus, a platform 34 meeting the requirements in regard to a flat configuration can be indicated with simple use and thus in extremely cost effective manner. In particular, it can be seen from the representation of the boundary element 37 that the boundary elements 37, 38, 39 do not reach as far as the surface of the bottom plate 34. This has the advantage that adhesion and/or capillary forces due to contact of the boundary elements 37, 38, 39 with the liquid reagents are avoided or minimized. The boundary elements 37, 38, 39 ensure that a slippage of the slide 2 is limited. Furthermore, a jamming of the slide 2 beneath one of the boundary elements 37, 38 or 39 is effectively prevented. The boundary element(s) 38 define the spacing between the slide 2 and the upright or slanted side wall 43, this spacing making it possible to introduce a pipetting needle or pipette tip. Furthermore, the boundary elements 37 and 39 ensure that the non-recessed portions of a suction nozzle 12, 12', shown for example in FIG. 15, have enough room to enclose a corner of the slide 2 with form fit, making possible the aspiration of liquid reagents.

Furthermore, FIG. 17 shows that the surrounding walls 41, 43 of the platform 34 are configured slanted or with an angle of more than 90° to the surface of the bottom plate 34. This makes it easier to introduce a pipetting needle or pipette tip through a leadthrough 20 present in the lid 5, so that liquids or reagents can be placed more easily into the incubation chamber 1'. In addition, the angle of more than 90° between the surface of the platform 34 and the side walls 41, 43 prevents the liquid reagents from spreading along the edge before flowing beneath the slide 2 which is slightly raised or situated parallel to the bottom plate 34 on the spacers 36 (the "corner effect"). It has been discovered in experiments that this corner effect is lessened if the side walls 41, 43 are slanted with an outward inclination, as in FIGS. 17 and 18. If is advantageous for the angles between the surface of the platform 34 and the side walls 41, 43 to be between 95 and 120°, especially between 95 and 115°, especially between 95 and 110°, especially between 100 and 110°, especially between 105 and 110°.

FIG. 18 shows the platform 34 of FIG. 17, where the boundary element 38 is not present. However, thanks to the slanting of the side wall 43, even without a boundary element 38 there is a sufficient spacing to introduce a liquid reagent along the inside of the side wall 43 into the incubation chamber 1'. In particular, the reagent can be introduced into the incubation chamber 1' at approximately mid-height of the side wall 43, so that it flows into the non-right angled edge between the surface of the bottom plate 34 and the side wall 43 and from there can flow directly beneath the slightly raised slide 2 or the slide resting in parallel on the spacers 36. The surface of the platform 34 shown in FIG. 18 is reduced in its width such that the freedom of movement of the slide 2 is restricted to the same extent as for a platform 34 having a boundary element 38.

FIG. 19 shows another embodiment of the platform 34 in which the spacers 36, the boundary elements 37, 38, 39 and the separation edge 46 are integral components of the platform 34. In particular, the boundary elements 37, 38, 39 are likewise formed by a forming process of the material of the surrounding side walls 41, 42, 43. By contrast with the platforms 34 shown in FIGS. 17 and 18, the boundary elements 37, 38, 39 are formed as material protrusions (bulges). Thus, a platform 34 meeting the requirements in regard to a flat configuration can be indicated with simple use and thus in extremely cost effective manner. The boundary elements 37, 38, 39 ensure that a slippage of the slide 2 is limited. Furthermore, a jamming of the slide 2 beneath one of the boundary elements 37, 38 or 39 is effectively prevented. The boundary elements 38 define the spacing between the slide 2 and the upright side wall 43, this spacing making it possible to introduce a pipetting needle or pipette tip. In addition, holding elements 68 are provided in the embodiment of the platform 34 shown in FIG. 19, which secure the platform 34 against slippage by a frictional connection with complementary material bulges of the base body 4 or the lid 5.

Similar to FIG. 1, FIG. 20 shows a device 1 according to the disclosure which is configured as an incubation chamber 1' for a slide 2. The incubation chamber 1' includes a moving arrangement 3, a platform 34 as shown in FIG. 17 to accommodate the slide 2, and a lid 5.

The device 1 of the disclosure configured as an incubation chamber 1' is represented in FIG. 20 with open lid 5, being secured by a holding block 11 to a base plate 69 provided for this purpose. Thus, the platform 34 lies directly on the heating block 70 which is present on the base plate 69. The lid 5 furthermore includes elongated side walls 71, which reach down as far as the base plate 69 when the lid is closed and thus seal off the incubation chamber, without requiring a seal arranged along the bottom side of the lid 5. This has design benefits in particular for incubation chambers 1' with multi-piece base bodies 4, as are represented for example in FIGS. 9 and 20. In the lid designs represented in FIGS. 1 to 3 and 8, the sealing of the incubation chambers 1' is realized by a silicone seal or form-fitting connections between the underside of the lid 5 and the base body 4 and the moving arrangement 3. Corresponding surfaces are formed for this purpose on the base body 4 and on the moving arrangement 3.

FIG. 21 shows the lid 5 of the incubation chamber 1' of FIG. 20 separately. In particular, it is shown that the side walls 71 are fastened by screws 72 to the sides of the lid 5. For the connection to the holding block 11 of the incubation chamber 1', the side walls 71 contain fastening openings 73, which can be connected to corresponding fastening elements of the holding block 11. Furthermore, the leadthrough closure 74 of the leadthrough 20 is shown. As already described, this leadthrough closure 74 can be made of silicone and may have a cross slot, so that a pipetting needle or pipette tip can be pushed through the leadthrough, but at the same time the saturated atmosphere in the incubation chamber 1' remains intact. The lid 5 represented in FIG. 21 can be made for example as a separate workpiece in the injection molding process. In addition, the lid 5 may have a barcode reading window 19 for reading the barcode 10 of the slide 2. The barcode reading window 19 may consist of transparent material, e.g., glass of Makrolon. Alternatively, the entire lid 5 can be made from a transparent material, such as Makrolon.

Regarding further advantageous embodiments of the device and the method according to the disclosure, refer to the general portion of the specification and to the enclosed claims, in order to avoid repetition.

Finally, it should be expressly pointed out that the above described exemplary embodiments of the device according to the disclosure serve merely to explain the teaching claimed, but not to restrict it to the exemplary embodiments.

LIST OF REFERENCE NUMERALS

1 Device
1' Incubation chamber
2 Slide
3 Moving arrangement
4 Base body
5 Lid
6 Corner region of slide not raised or only slightly raised in the collecting position
7 Moving device
7' Rocker
8 Rocker housing
9 Labeling section
10 Barcode
11 Holding block
12 Outlet
12' Suction nozzle
13 End of suction nozzle impinging on slide
14 Abutment
15 Closure
16 Receiving region of the closure for a latching element
17 Latching element
18 Grip lip
19 Barcode reading window
20 Leadthrough
21 Receiving region for lifting device
22 Anchoring element
22' Pin
23 Anchoring member
23' Abutting lip
24 Support
25 First rocker wall
26 Second rocker wall
27 Rear wall of rocker
28 Front inner wall
29 Fixation points
30 Indentation/bulge of rocker housing
31, 32, 33 Encircling walls of rocker housing
31' Inner sides
34 Platform or bottom plate
35 Suction location
36 Spacer
37, 38, 39 Boundary element
40 Inner rear wall of base body
41, 42, 43 Encircling walls of base body
44 Material protrusion of base body
45 Overflow basin
46 Separation edge
47 Region for introducing liquid
47' Mixing zone
48 Bulge
49 First edge of slide
50 Second edge of slide

The invention claimed is:

1. A method of wetting a biological material with at least one liquid, the method comprising:
moving, by a moving arrangement, a substantially triangular or rectangular, slide in a device comprising said moving arrangement and a base body with a bottom plate configured to receive said slide, from a parallel incubating position, relative to a bottom plate within said base body, to a non-parallel collecting position, relative to the bottom plate within said base body,
wherein said base body comprises walls, which are sealingly connected to said bottom plate and which limit the movement of said slide relative to said bottom plate within said base body,
wherein, in said parallel incubating position, a capillary gap is formed between said slide and said bottom plate,
wherein, in said non-parallel collecting position, only a single corner section of said slide is positioned such that said liquid is collected in said single corner section of said slide as well as in a corresponding corner section of said base body formed by said bottom plate and two of said walls, and
wherein said biological material is located on the side of said slide facing toward said capillary gap.

2. The method according to claim 1, wherein said method is for performing one or more of immunohistochemical analyses, in situ hybridization analyses, tissue staining, and bio-chip staining, on said biological material, and wherein the biological material includes tissue or cell sections.

3. The method according to claim 1, wherein during said step of moving said slide from said parallel incubating position to said non-parallel collecting position, said moving arrangement repeatedly moves said slide from said incubating position into said collecting position to thereby cause mixing of said liquid in said capillary gap, to cause removal of bubbles from said capillary gap, and/or to cause acceleration of biochemical reactions in said capillary gap.

4. The method according to claim 1, wherein during said step of moving said slide from said parallel incubating position to said non-parallel collecting position, said slide is moved into a non-parallel mixing position, relative to said bottom plate of said base body, wherein said non-parallel mixing position is a position between said incubating position and said non-parallel collecting position, in which a space between said slide and said bottom plate forms a flow connection between a mixing zone of said device and said single corner section of said slide as well as said corresponding corner section of said base body such that reagents, which are introduced into said mixing zone flow through said flow connection to said single corner section of said slide as well as to said corresponding corner section of said base body and are mixed when the moving arrangement causes said slide to repeatedly move from said non-parallel collecting position into said non-parallel mixing position, to generate a liquid that wets said biological material.

5. The method according to claim 1, wherein the moving arrangement further comprises:
   a moving device including a support for said slide.

6. The method according to claim 5, wherein said device further comprises an abutment,
   wherein said abutment contacts said slide to thereby move said slide from the incubating position into the non-parallel collecting position.

7. The method according to claim 5, wherein during said step of moving said slide from said parallel incubating position to said non-parallel collecting position, said moving device is first transferred into a lifted position and then into a tilted position by a lifting device,
   wherein in said lifted position at least two corner sections of said slide are not elevated or are only slightly elevated relative to said bottom plate, and
   wherein said slide in said tilted position is in said non-parallel collecting position.

8. The method according to claim 7, wherein said moving device comprises a receiving region for said lifting device, wherein the lifting device includes a ram,
   wherein said receiving region includes an anchoring element for said lifting device, which defines an axis of said moving device about which said moving device is turned into said tilted position during said step of moving said slide from said parallel incubating position to said non-parallel collecting position.

9. The method according to claim 8, wherein the moving device further includes an anchoring member that is brought into contact with a corresponding anchoring area,
   wherein bringing said anchoring member into contact with said anchoring area acts to turn said moving device from said elevated position into said tilted position during said step of moving said slide from said parallel incubating position to said non-parallel collecting position.

* * * * *